US011878531B2

(12) United States Patent
Shimomura et al.

(10) Patent No.: US 11,878,531 B2
(45) Date of Patent: Jan. 23, 2024

(54) WIPING DEVICE AND LIQUID DISCHARGE APPARATUS

(71) Applicant: SEIKO EPSON CORPORATION, Tokyo (JP)

(72) Inventors: Masaki Shimomura, Matsumoto (JP); Seiya Sato, Matsumoto (JP); Toshihiro Imae, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 84 days.

(21) Appl. No.: 17/483,017

(22) Filed: Sep. 23, 2021

(65) Prior Publication Data

US 2022/0097381 A1 Mar. 31, 2022

(51) Int. Cl.
*B41J 2/165* (2006.01)

(52) U.S. Cl.
CPC ....... *B41J 2/16544* (2013.01); *B41J 2/16535* (2013.01); *B41J 2/16538* (2013.01); *B41J 2/16508* (2013.01)

(58) Field of Classification Search
CPC .. B41J 2/1654; B41J 2/16535; B41J 2/16538; B41J 2/16508; B41J 2/16544
See application file for complete search history.

(56) References Cited

U.S. PATENT DOCUMENTS 8,398,205 B2 * 3/2013 Roth .................... B41J 2/16547 347/33

FOREIGN PATENT DOCUMENTS

JP 2016175275 A 10/2016

* cited by examiner

*Primary Examiner* — Geoffrey S Mruk
(74) *Attorney, Agent, or Firm* — CHIP LAW GROUP

(57) ABSTRACT

A wiping device includes a wiper unit, a carriage, and a fixing member. The wiper unit includes a wiper that wipes a liquid discharge surface of a liquid discharge head from which liquid is to be discharged. The carriage moves along the liquid discharge surface in a first direction and a second direction, both of which are opposite to each other. The fixing member fixes the wiper unit to the carriage. When the carriage is disposed on a side in the first direction with respect to a middle point in a moving range of the carriage, the fixing member is removable in the first direction.

14 Claims, 19 Drawing Sheets

WIPING DEVICE AND LIQUID DISCHARGE APPARATUS

The present application is based on, and claims priority from JP Application Serial Number 2020-163396, filed Sep. 29, 2020, the disclosure of which is hereby incorporated by reference herein in its entirety.

BACKGROUND

1. Technical Field

The present disclosure relates to a wiping device that wipes a liquid discharge surface of a liquid discharge head from which liquid is to be discharged and also relates to a liquid discharge apparatus with this wiping device.

2. Related Art

Ink jet printers, which are one example of liquid discharge apparatuses, typically employ a cleaning configuration in which a wiper wipes an ink discharge surface of an ink discharge head. JP-A-2016-175275 discloses an example of such ink jet printers, in which a sweep member is provided as a wiper in a sweep unit. This sweep unit is driven by a motor and moves along the long side of the ink discharge head while wiping the ink discharge surface of the ink discharge head.

The above ink jet printer is configured such that an operator can access the sweep member by opening the rear cover and detach it from the sweep unit after having removed screws.

As illustrated in FIG. 33 of the above patent document, in order to remove the screws from the sweep unit, an operator needs to unscrew them from the top. This means that the operator needs to access the screws from a different direction from that in which he/she has accessed the sweep member. Therefore, this configuration cannot be satisfactory in terms of maintainability. Besides, in this ink jet printer, a frame that fixes the motor is disposed in the rear of the sweep member. Thus, to take out the sweep member through the rear of the ink jet printer, the operator needs to lift it in order to avoid the frame after having removed the screws. For this reason, the ink jet print requires a large inner space above the sweep member, which may result in the enlargement of the outer body and lowering of design flexibility because it is difficult to mount other parts above the sweep member.

SUMMARY

According to an aspect of the present disclosure, a wiping device includes: a wiper unit that includes a wiper that wipes a liquid discharge surface of a liquid discharge head from which liquid is to be discharged; a carriage that moves along the liquid discharge surface both in a first direction and in a second direction, the first direction being opposite to the second direction; and a fixing member that fixes the wiper unit to the carriage. When the carriage is disposed on a side in the first direction with respect to a middle point in a moving range of the carriage, the fixing member is removable in the first direction.

According to another aspect of the present disclosure, a wiping device includes: a wiper unit that includes a wiper that wipes a liquid discharge surface of a liquid discharge head from which liquid is to be discharged; and a carriage that moves along the liquid discharge surface both in a first direction and in a second direction, the first direction being opposite to the second direction, the carriage being fixed to the wiper unit. When the carriage is disposed on a side in the first direction with respect to a middle point in a moving range of the carriage, the wiper unit is detachable in the first direction while partly covering the carriage in a direction normal to the liquid discharge surface.

According to still another aspect of the present disclosure, a wiping device includes: a wiper unit that includes a wiper that wipes a liquid discharge surface of a liquid discharge head from which liquid is to be discharged; a carriage that moves along the liquid discharge surface both in a first direction and in a second direction, the first direction being opposite to the second direction, the carriage being fixed to the wiper unit; a receptacle disposed in one of the wiper unit or the carriage, the receptacle being recessed in the first direction; and an insertion section disposed in the other of the wiper unit or the carriage, the insertion section being inserted into the receptacle.

According to yet another aspect of the present disclosure, a liquid discharge apparatus includes: a liquid discharge head that discharges liquid; one of the wiping devices of the above aspects; a casing that houses the liquid discharge head and the wiping device; and a cover disposed, in an openable/closable manner, on one of side-surfaces of the casing which is located on a side in the first direction with respect to the wiping device. The cover allows access to the wiper unit by being opened.

DESCRIPTION OF EXEMPLARY EMBODIMENTS

Figure 1:
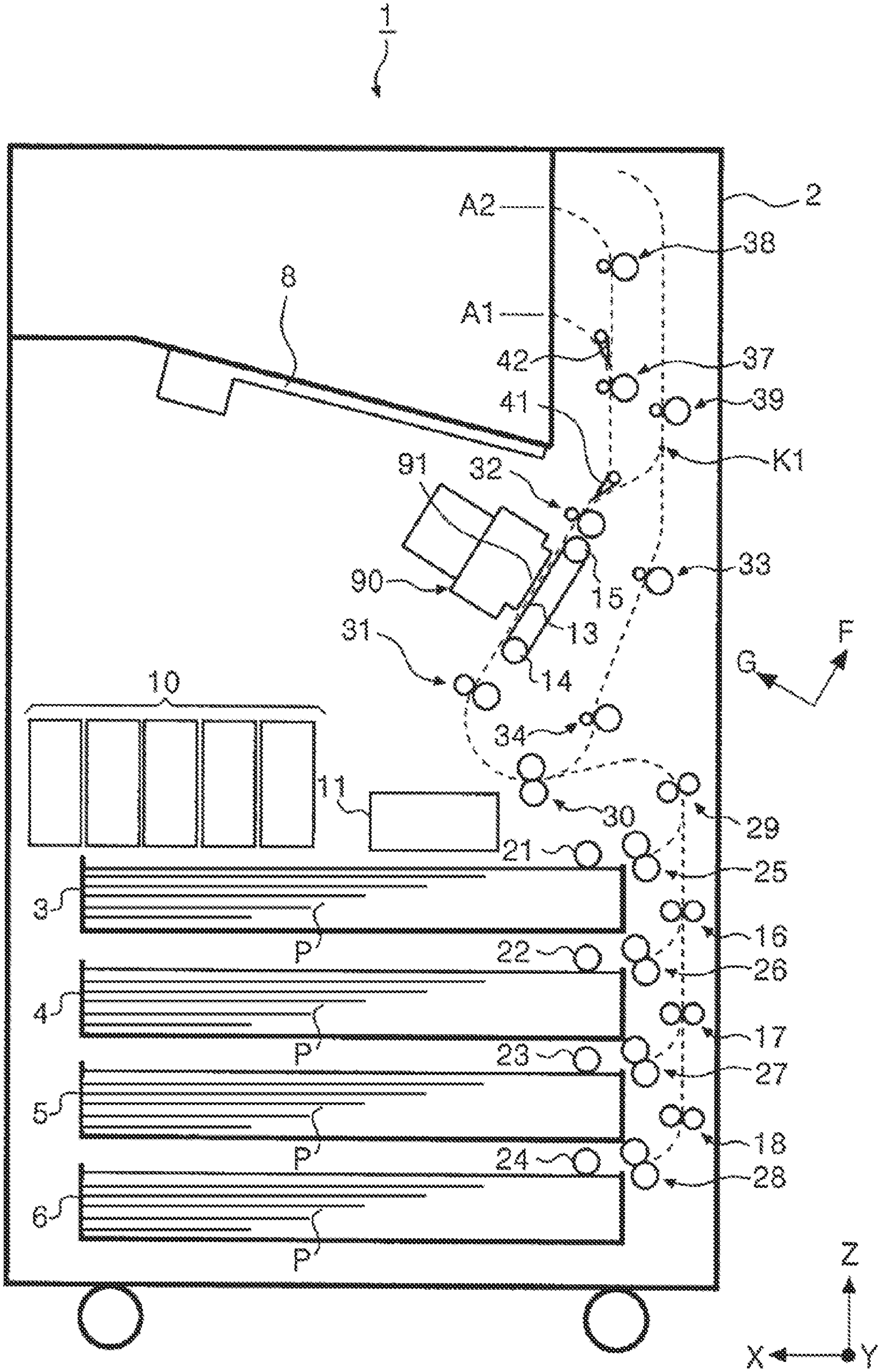
FIG. 1 illustrates medium transport routes inside a printer according to an embodiment of the present disclosure.

Some aspects of the present disclosure will be described below briefly. According to a first aspect of the present disclosure, a wiping device includes: a wiper unit that includes a wiper that wipes a liquid discharge surface of a liquid discharge head from which liquid is to be discharged; a carriage that moves along the liquid discharge surface both in a first direction and in a second direction, the first direction being opposite to the second direction; and a fixing member that fixes the wiper unit to the carriage. When the carriage is disposed on a side in the first direction with respect to a middle point in a moving range of the carriage, the fixing member is removable in the first direction.

In the first aspect, the fixing member that fixes the wiper unit to the carriage is removable in the first direction when the carriage is disposed on the side in the first direction with respect to the middle point in the moving range of the carriage. This configuration therefore enables a maintenance person to easily remove the fixing member after he/she has accessed the wiper unit from the first direction and before he/she detaches the wiper unit in the first direction.

According to a second aspect of the present disclosure, the fixing member may be disposed on the side in the first direction with respect to a central point of the carriage in a moving direction of the carriage.

In the second aspect, the fixing member is disposed on the side in the first direction with respect to the central point of the carriage in the moving direction of the carriage. This configuration therefore enables a maintenance person to further easily remove the fixing member in the first direction.

According to a third aspect of the present disclosure, the wiping device of the first or second aspect may further include: a first side-frame disposed on the side in the first direction with respect to the middle point; a second side-frame disposed on a side in the second direction with respect to the middle point; and a coupling member that extends in the moving direction of the carriage and that couples the first side-frame to the second side-frame. The fixing member may be disposed on the side in the first direction with respect to the first side-frame in the moving direction of the carriage.

In the third aspect, the fixing member is disposed on the side in the first direction with respect to the first side-frame in the moving direction of the carriage. In other words, the fixing member is not disposed between the first side-frame and the second side-frame but outside the first side-frame. This configuration enables a maintenance person to easily remove the fixing member even after the wiping device has been dropped on the floor, for example. This is because the fixing member is less likely to be stuck between the first side-frame and the second side-frame when the fixing member is hit on the floor.

According to a fourth aspect of the present disclosure, the wiping device of one of the first to third aspects may further include: a receptacle disposed in one of the wiper unit or the carriage; and an insertion section disposed in the other of the wiper unit or the carriage. The insertion section may be inserted into the receptacle to fix the wiper unit to the carriage in a direction intersecting the first direction.

In the fourth aspect, the wiper unit is fixed to the carriage in a direction intersecting the first direction. This configuration can easily fix the wiper unit to the wiper carriage without using any member other than the fixing member.

According to a fifth aspect of the present disclosure, the wiper may be disposed in a diagonal position that intersects both a horizontal direction and a vertical direction. The wiper unit may include a liquid reservoir that stores liquid removed by the wiper. The fixing member may be disposed higher than the liquid reservoir in the vertical direction.

In the fifth aspect, the fixing member is disposed higher than the liquid reservoir in the vertical direction. This configuration suppresses the part of the wiper unit fixed by the fixing member from decreasing the capacity of the liquid reservoir.

According to a sixth aspect of the present disclosure, the fixing member may be a first fixing member. The wiping device of the fifth aspect may further include: a coupling unit that, when the carriage is disposed on the side in the first direction with respect to the middle point, becomes coupled to the wiper unit and absorbs the liquid stored in the liquid reservoir; and a second fixing member that fixes the coupling unit to an attachment frame, the second fixing member being removable in the first direction.

The above configuration enables a maintenance person to easily remove the second fixing member after he/she has accessed the coupling unit from the first direction and before he/she detaches the coupling unit in the first direction.

According to a seventh aspect of the present disclosure, the wiper unit may be detachable in the first direction while partly covering the carriage in a direction normal to the liquid discharge surface.

In the seventh aspect, the wiper unit is detachable in the first direction while partly covering the carriage in a direction normal to the liquid discharge surface. This configuration enables a maintenance person to detach the wiper unit from the carriage without largely moving the wiper unit in the normal direction. Thus, the configuration does not need to reserve a large space in the direction normal to the wiper unit. It is therefore possible to provide a wiping device that is effective in downsizing an apparatus and that enables one or more parts to be flexibly mounted in the direction normal to the wiper unit.

According to an eighth aspect of the present disclosure, the fixing member may be a screw.

In the eighth aspect, the fixing member is a screw and thus can be easily removed in the first direction.

According to a ninth aspect of the present disclosure, a wiping device includes: a wiper unit that includes a wiper that wipes a liquid discharge surface of a liquid discharge head from which liquid is to be discharged; and a carriage that moves along the liquid discharge surface both in a first direction and in a second direction, the first direction being opposite to the second direction, the carriage being fixed to the wiper unit. When the carriage is disposed on a side in the first direction with respect to a middle point in a moving range of the carriage, the wiper unit may be detachable in the first direction while partly covering the carriage in a direction normal to the liquid discharge surface.

In the seventh aspect, the wiper unit is detachable in the first direction while partly covering the carriage in the direction normal to the liquid discharge surface. This configuration enables a maintenance person to detach the wiper unit from the carriage without largely moving the wiper unit in the normal direction. Thus, the configuration does not need to reserve a large space in the direction normal to the wiper unit. It is therefore possible to provide a wiping device that is effective in downsizing an apparatus and that enables one or more parts to be flexibly mounted in the direction normal to the wiper unit.

According to a tenth aspect of the present disclosure, a wiping device includes: a wiper unit that includes a wiper that wipes a liquid discharge surface of a liquid discharge head from which liquid is to be discharged; a carriage that moves along the liquid discharge surface both in a first direction and in a second direction, the first direction being opposite to the second direction, the carriage being fixed to the wiper unit; a receptacle disposed in one of the wiper unit or the carriage, the receptacle being recessed in the first direction; and an insertion section disposed in the other of the wiper unit or the carriage, the insertion section being inserted into the receptacle.

In the tenth aspect, a maintenance person can disengage the insertion section from the receptacle by displacing the wiper unit away from the carriage in the first direction. This configuration enables the maintenance person to detach the wiper unit from the carriage without largely moving the wiper unit in the direction normal to the liquid discharge surface. Thus, the configuration does not need to reserve a large space in the direction normal to the wiper unit. It is therefore possible to provide a wiping device that is effective in downsizing an apparatus and that enables one or more parts to be flexibly mounted in the direction normal to the wiper unit.

According to an eleventh aspect of the present disclosure, a liquid discharge apparatus includes: a liquid discharge head that discharges liquid; the wiping device according to one of the first to tenth aspects; a casing that houses the liquid discharge head and the wiping device; and a cover disposed, in an openable/closable manner, on one of side-surfaces of the casing which is located on a side in the first direction with respect to the wiping device, the cover allowing access to the wiper unit by being opened.

The configuration of the eleventh aspect enables a maintenance person to access the wiper unit by opening the cover, thereby successfully producing the effect of any of the first to tenth aspects.

Next, some embodiments of the present disclosure will be described below with reference to the accompanying drawings. Herein, an ink jet printer 1, referred to below as the printer 1, is configured to record information on media by discharging ink onto the media. In this case, the ink jet printer 1 is an example of a liquid discharge apparatus; the media are representative of record sheets; and the ink is an example of liquid. The individual drawings employ an X-Y-Z orthogonal coordinate system. The Y-axis extends perpendicularly to the transport direction of the media. Further, the +Y direction is the direction from the rear to the front of the printer 1 and corresponds to a first direction herein, which is one of moving directions of a wiper carriage 70 (described later). The −Y direction is the direction from the front to the rear of the printer 1 and corresponds to a second direction herein, which is another of the moving directions of the wiper carriage 70. The X-axis extends along the width of the printer 1. Further, the +X direction is the direction from the right to the left of the printer 1 as viewed from an operator present in front, whereas the −X direction is the direction from the left to the right of the printer 1. The Z-axis extends along the height of the printer 1. Further, the +Z direction is the direction from the bottom to the top of the printer 1, whereas the −Z direction is the direction from the top to the bottom of the printer 1.

In the individual drawings, the G-axis is an axis normal to an ink discharge surface 92 of a line head 91 (described later). The +G direction is the direction in which a head unit 90 (described later) moves away from a transport belt 13, whereas the −G direction is the direction in which the head unit 90 moves toward the transport belt 13. The F-axis is an axis parallel to the ink discharge surface 92. Further, the ±F directions are the directions in which the media are transported along the ink discharge surface 92: the +F direction is the downward transport direction; and the −F direction is the downward transport direction. Hereinafter, the direction in which a medium is fed is sometimes referred to as the downward direction, whereas the opposite direction is sometimes referred to as the upward direction.

In FIG. 1, the broken lines indicate the medium transport routes inside the printer 1. The printer 1 includes a plurality of medium cassettes arranged side by side vertically in a lower portion of a casing 2 of the printer 1. In this embodiment, a first medium cassette 3, a second medium cassette 4, a third medium cassette 5, and a fourth medium cassette 6 are arranged in this order from the top. The reference character P denotes a medium accommodated in each medium cassette. The first medium cassette 3 includes a pick roller 21 that feeds a medium accommodated therein. Likewise, the second medium cassette 4 includes a pick roller 22; the third medium cassette 5 includes a pick roller 23; and the fourth medium cassette 6 includes a pick roller 24.

The first medium cassette 3 includes a feed roller pair 25 that feeds a medium diagonally upward. Likewise, the second medium cassette 4 includes a feed roller pair 26; the third medium cassette 5 includes a feed roller pair 27; and the fourth medium cassette 6 includes a feed roller pair 28. Furthermore, the second medium cassette 4 includes a transport roller pairs 16 that feeds a medium diagonally upward. Likewise, the third medium cassette 5 includes a transport roller pairs 17; the fourth medium cassette 6 includes a transport roller pair 18. It should be noted that each roller pair refers to a pair of drive roller and driven roller unless specified otherwise: the drive roller is driven and rotated by a motor (not illustrated); and the driven roller rotates together with the drive roller.

When a medium is fed from one of the first medium cassette 3 to the fourth medium cassette 6, the medium reaches a transport roller pair 29 and is forcedly fed by transport roller pair 29 in a diagonally upward direction that contains the +X- and +Z-directional components. After being transported along a downwardly curved medium transport route disposed downstream of the transport roller pair 29, the medium reaches a transport roller pair 30 and is forcedly fed in the +X direction by the transport roller pair 30. Then, the medium is transported along the upwardly curved medium transport route and reaches a transport roller pair 31.

Continuing to the above, the medium is forcedly fed by the transport roller pair 31 to the site between the line head 91 and the transport belt 13, namely, the site facing the line head 91. Herein, the line head 91 is an example of a liquid discharge head. Then, the line head 91 records information on the medium by discharging liquid, such as ink, onto the medium. In this case, the line head 91 is an ink discharge head with nozzles (not illustrated) via which the ink is to be discharged. Since these nozzles are arranged across the entire width of the medium, the line head 91 is formed as an ink discharge heat that can record the information over the medium without moving along the width of the medium.

The printer 1 further includes: an ink storage 10 that stores the ink to be supplied to the line head 91 via a tube (not illustrated) and to be discharged from the line head 91; and a waste liquid storage 11 that stores waste ink. In this case, the ink storage 10 may include a plurality of ink tanks arranged side by side in the +X direction.

The transport belt 13 is an endless belt looped between pulleys 14 and 15, at least one of which is driven and rotated by a motor (not illustrated). The medium is transported to the site facing the line head 91 while held on a surface of the transport belt 13 by a known absorption system, such as an air or electrostatic absorption system.

The medium transport route along which the medium passes through the site facing the line head 91 extends in a diagonally upward direction, namely, in a direction intersecting both the horizontal and vertical directions. This diagonally upward direction contains the −X- and +Z-directional components in FIG. 1. Forming the medium transport route in this manner successfully reduces the horizontal size of the printer 1. In this embodiment, the medium transport route that passes through the site facing the line head 91 may form an angle of 50° to 70°, more specifically an angle of about 60° with the horizontal surface.

After information has been recorded on one side of the medium by the line head 91, the medium is further fed diagonally upward by a transport roller pair 32 disposed downstream of the transport belt 13. Disposed downstream of the transport roller pair 32 is a flap 41, which switches between two medium transport routes. When the medium is ejected in this state, the medium is fed by the flap 41 to the route leading to a transport roller pair 37 disposed above the flap 41. Disposed downstream of the transport roller pair 37 is a flap 42, which switches between the routes leading to an ejection position A1 and a transport roller pair 38 disposed above the flap 42. When fed to the transport roller pair 38, the medium is ejected from the printer 1 at the ejection position A2. After having been ejected at the ejection position A1, the medium is placed on an ejection tray 8 extending in a diagonally upward direction that contains the +X- and +Z-directional components. After having been ejected at the ejection position A2, the medium is placed on an optional tray (not illustrated).

When information is recorded on the second side of the medium in addition to the first side, the medium is fed by the flap 41 in the diagonally upward direction that contains the −X- and +Z-directional components. Then, the medium is transported along a switchback route via a branch position Kl. Disposed in this switchback route is a transport roller pair 39, by which the medium is fed upward along the switchback route. When the downstream edge of the medium passes through the branch position Kl, the transport roller pair 39 reverses its rotational direction so that the medium is, in turn, fed downward.

After transported downward by the transport roller pair 39, the medium is forcedly fed by both a transport roller pair 33 and a transport roller pair 34 and reaches the transport roller pair 30. Then, the medium is fed to the site facing the line head 91 again by the transport roller pair 31. When the medium reaches the site facing the line head 91, the second side of the medium which is opposite to the first side on which the information has already been recorded faces the line head 91. In this way, information can be recorded on the second side of the medium by the line head 91. After the information has been recorded on the second side, the medium is ejected at the above ejection position A1 or A2.

Next, with reference to FIGS. 2 to 4, operations of the head unit 90, a cap carriage 65, and the wiper carriage 70 will be described below. The head unit 90 is a unit that includes the line head 91, which is driven by a head movement motor 102 (see FIG. 6) so as to move in the ±G directions. In this case, the power is transmitted from the head movement motor 102 to the head unit 90 via a rack-and-pinion mechanism (not illustrated). However, the mechanism for moving the head unit 90 is not limited to a rack-and-pinion mechanism: alternatively, it may be a belt-driven mechanism or a lead screw mechanism.

The cap carriage 65 is a unit that includes: a cap 67 that covers the line head 91; and a cap unit 66 with the cap 67. The cap carriage 65 is driven by a cap movement motor (not illustrated) so as to move in the ±F directions. In this case, the power is transmitted from the cap movement motor to the cap carriage 65 via a rack-and-pinion mechanism (not illustrated). However, the mechanism for moving the cap carriage 65 is not limited to a rack-and-pinion mechanism: alternatively, it may be a belt-driven mechanism or a lead screw mechanism.

The wiper carriage 70 is a unit that includes a wiper 84 that wipes the ink discharge surface 92 of the line head 91. The wiper carriage 70 is driven by a wiper movement motor 101 (see FIG. 6) so as to move in the ±Y directions. In this case, the power is transmitted from the wiper movement motor 101 to the wiper carriage 70 via a belt-driven mechanism (described later). However, the mechanism for moving the wiper carriage 70 is not limited to a belt-driven mechanism: alternatively, it may be a rack-and-pinion mechanism or a lead screw mechanism. As described above, the head unit 90, the cap carriage 65, and the wiper carriage 70 are configured to move in the directions perpendicular to one another.

Figure 2:
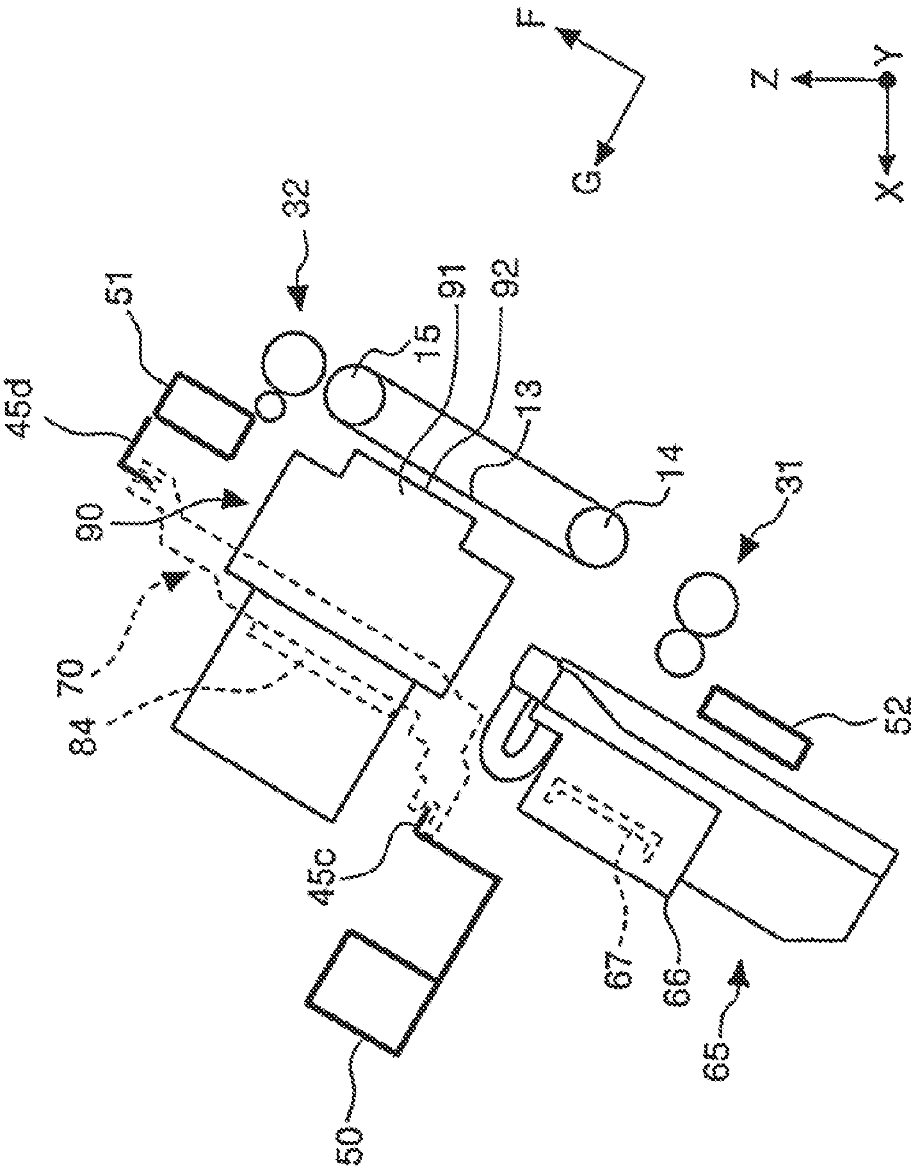
FIG. 2 illustrates the arrangement of the units surrounding the head unit when the head unit is disposed at an ink discharge position.
Figure 6:
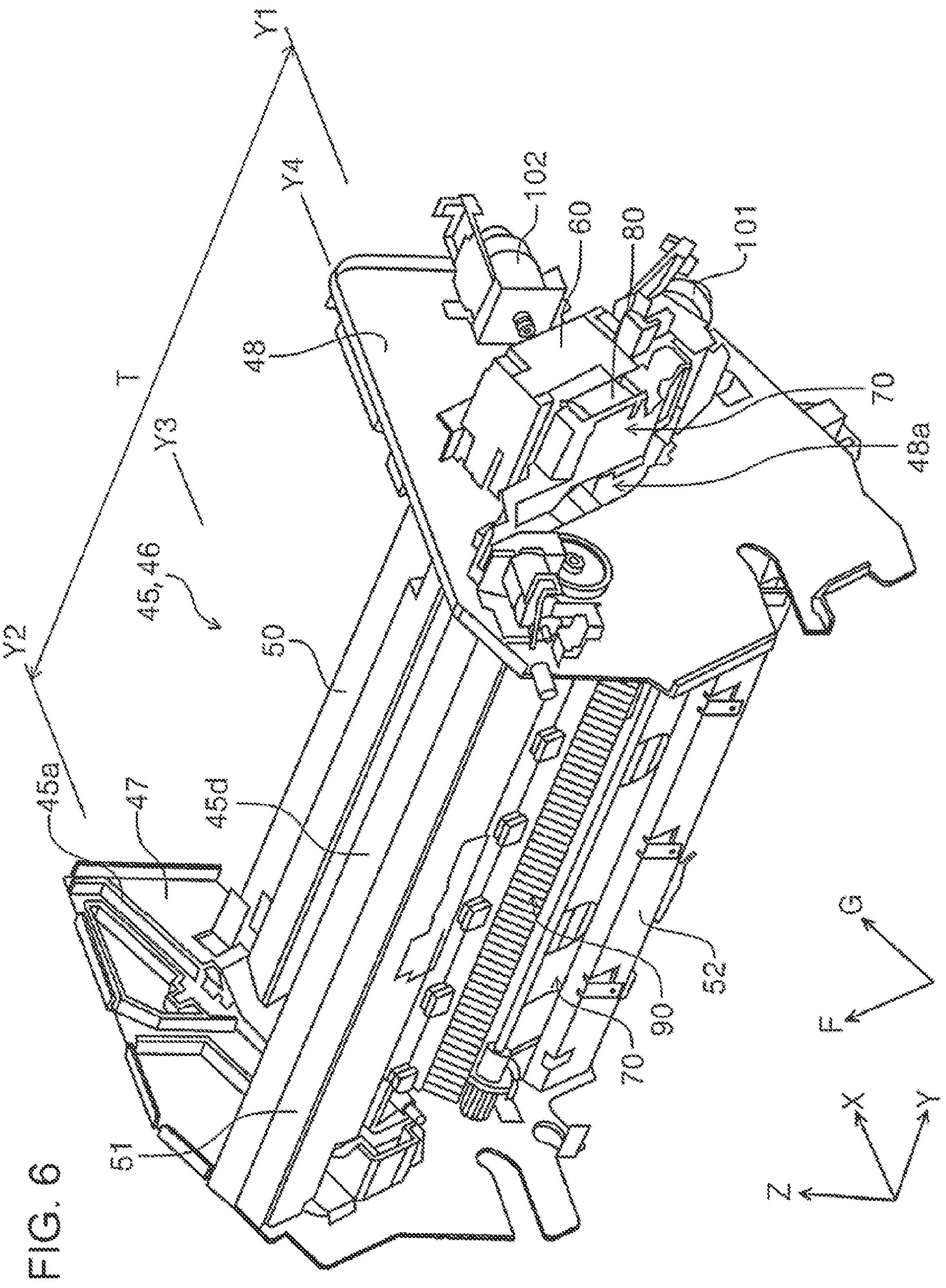
FIG. 6 is a perspective view of the motion unit.

FIG. 2 illustrates the arrangement of the units surrounding the line head 91 when the line head 91 records information on a medium. Hereinafter, the position of the head unit 90 in this state is referred to as the ink discharge position. When the head unit 90 is disposed at this ink discharge position, the cap carriage 65 is disposed apart from the head unit 90 in the −F direction as illustrated in FIG. 2, and the wiper carriage 70 is disposed at a home position set on the +Y-side of the head unit 90. In FIG. 6, the wiper carriage 70 is disposed at the home position.

Figure 3:
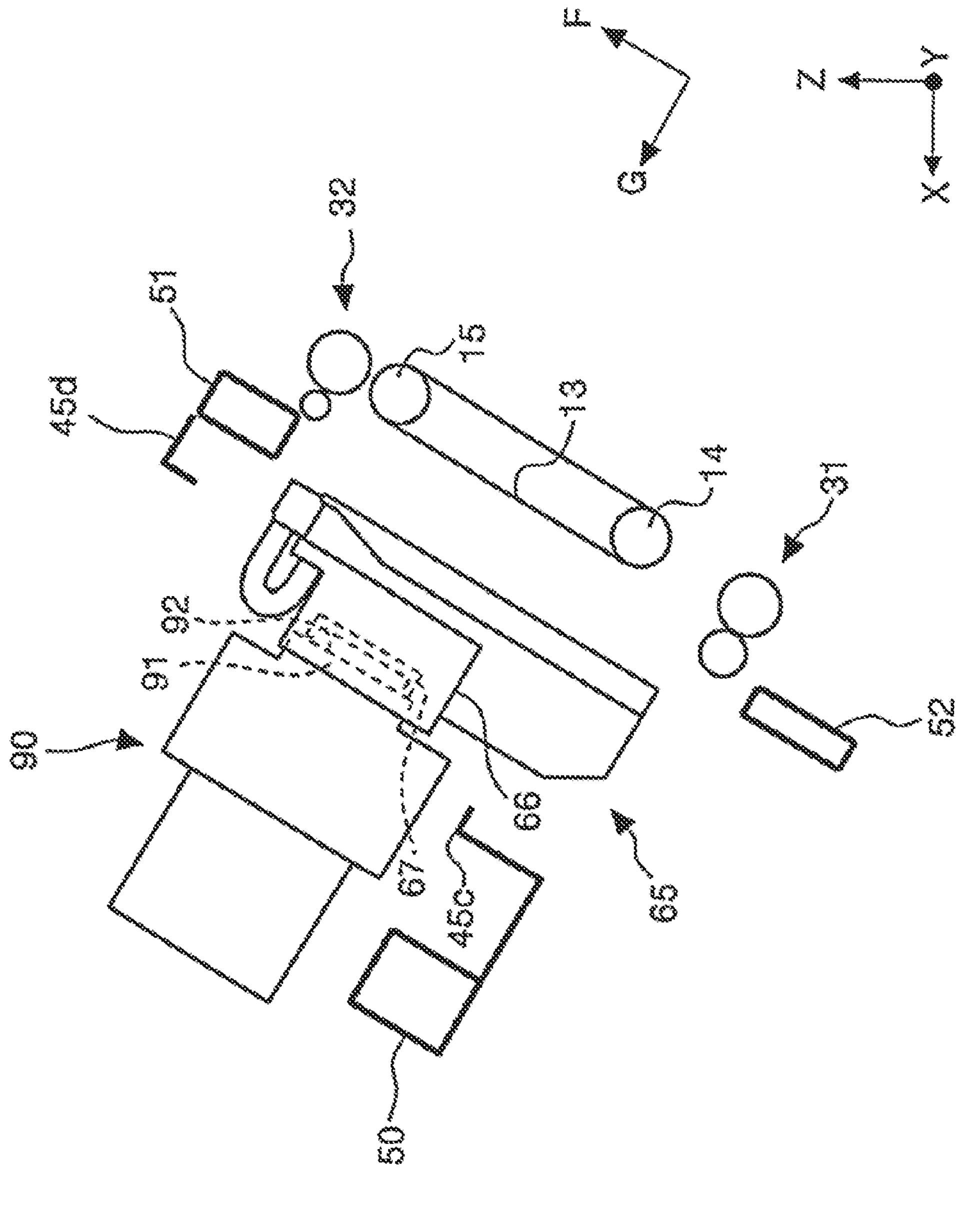
FIG. 3 illustrates the arrangement of the units surrounding the head unit when the head unit is disposed at a cap position.

FIG. 3 illustrates the arrangement of the units surrounding the head unit when the ink discharge surface 92 is covered with the cap 67. It should be noted that FIG. 3 does not illustrate the wiper carriage 70 for the sake of simplicity; however, the wiper carriage 70 is disposed at the home position set on the +Y-side as in the state of FIG. 2. Hereinafter, the position of the head unit 90 in FIG. 3 is referred to as the cap position. To move from the ink discharge position in FIG. 2 to the cap position in FIG. 3, the head unit 90 first moves in the +G direction from the ink discharge position in FIG. 2, then passes through the cap position in FIG. 3, and reaches a position apart from the cap position in the +G direction. The position of the head unit 90 in this case is referred to as the cap standby position. When the head unit 90 reaches the cap standby position, the cap carriage 65 moves in the +F direction until the cap 67 faces the ink discharge surface 92. Then, the head unit 90 slightly moves in the −G direction and reaches the cap position in FIG. 3 so that the ink discharge surface 92 is covered with the cap 67.

When the line head 91 performs a flushing operation, the head unit 90 in the state of FIG. 3 slightly moves in the +G direction so that the cap 67 is slightly apart from the ink discharge surface 92. The position of the head unit 90 in this case is referred to as the flushing position, which is set between the cap position and the cap standby position.

Figure 4:
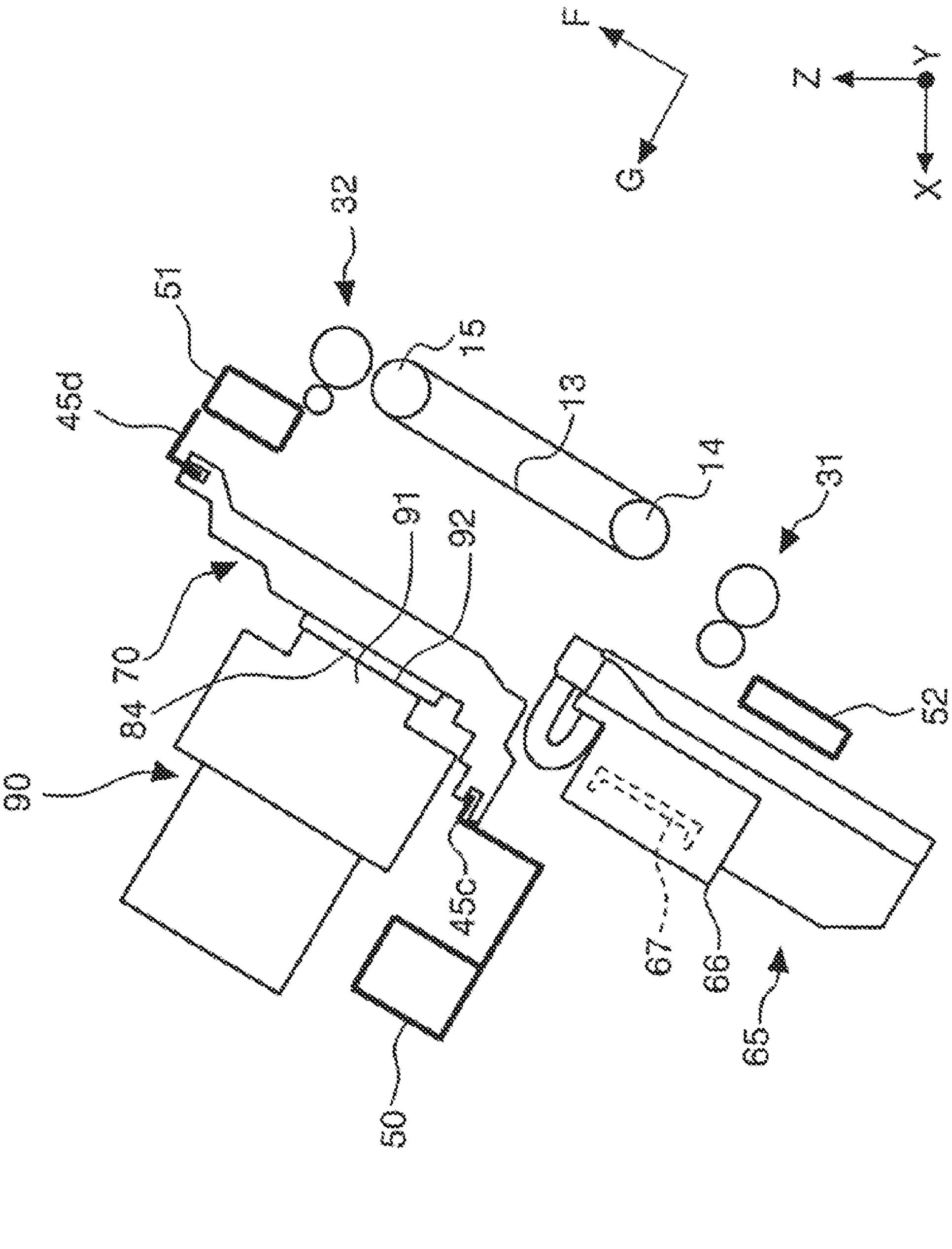
FIG. 4 illustrates the arrangement of the units surrounding the head unit when the head unit is disposed at a wiping position.

FIG. 4 illustrates the arrangement of the units surrounding the head unit 90 when the wiper 84 wipes the ink discharge surface 92. The position of the head unit 90 in this case is referred to as the wiping position. When the head unit 90 is disposed at the wiping position, the cap carriage 65 moves away from the head unit 90 in the −F direction, as illustrated in FIG. 2. To move from the ink discharge position in FIG. 2 to the wiping position in FIG. 4 in order for the wiper 84 to wipe the ink discharge surface 92, the head unit 90 first moves from the ink discharge position in FIG. 2, then passes through the wiping position in FIG. 4, and reaches a position apart from the wiping position in the +G direction. The position of the head unit 90 in this case is referred to as the wiping standby position. When the head unit 90 reaches the wiping standby position, the wiper carriage 70 moves from the home position to the end in the −Y direction. Then, when the head unit 90 moves in the −G direction and reaches the wiping position in FIG. 4, the wiper carriage 70 moves in the +Y direction while the wiper 84 is wiping the ink discharge surface 92.

Figure 5:
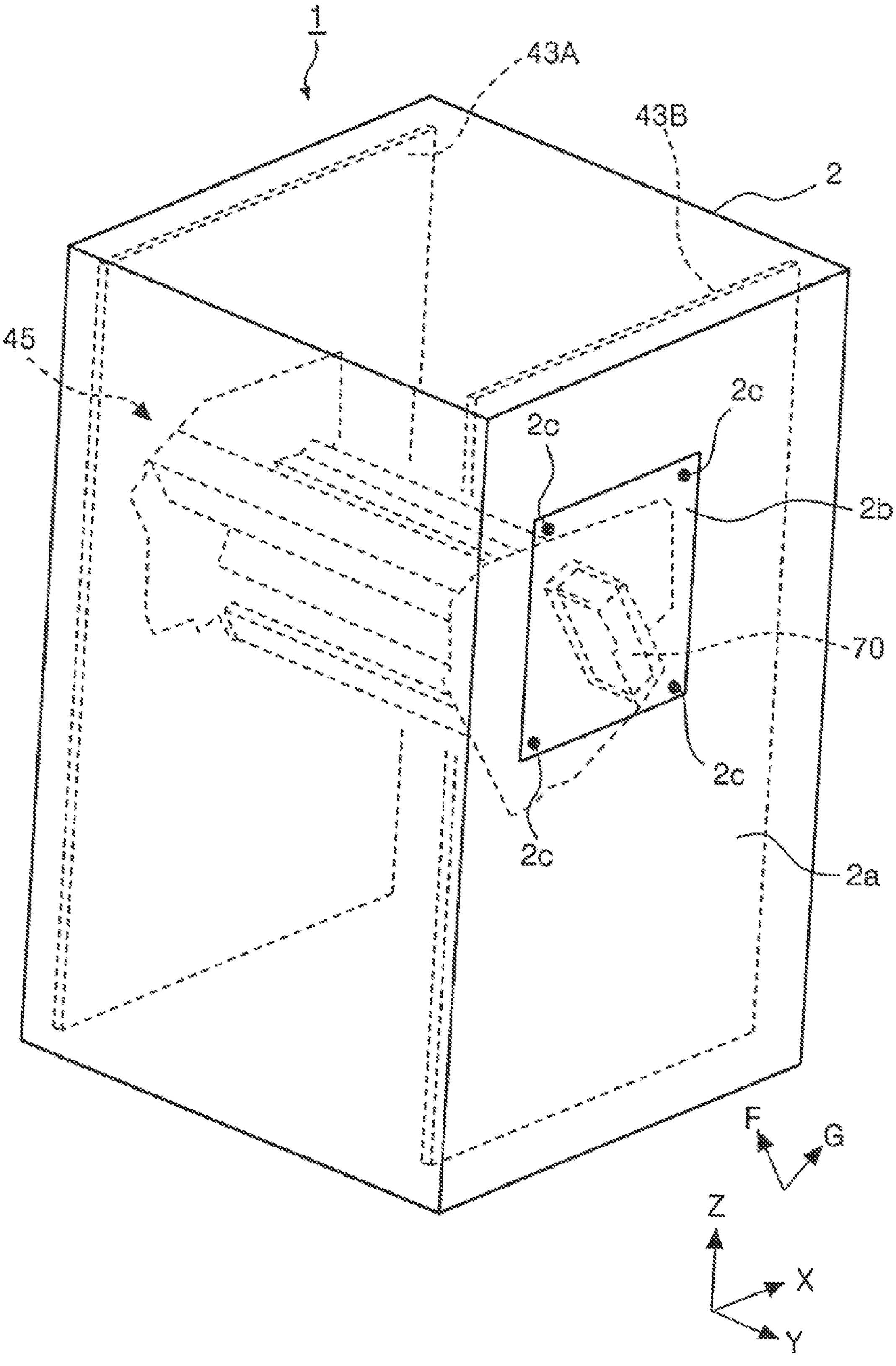
FIG. 5 is a rear perspective view of the printer.

Next, with reference to FIG. 5 and some other subsequent drawings, the wiper carriage 70 will be described below in detail. As illustrated in FIG. 5, the casing 2 has a cover **2*b* in an openable/closable manner on one of the side-surfaces 2*a* which is located on the rear side, or the +Y-side. In this embodiment, the cover 2*b* can be detached from the casing 2 by removing four screws 2*c* from the side-surface 2*a*, whereas the cover 2*b* can be attached to the casing 2 by fixing the screws 2*c* to the side-surface 2*a*. When a maintenance person maintains the printer 1, he/she may detach the cover 2*b* from the casing 2, access the wiper carriage 70 inside the casing 2, and detaches the wiper unit 80 (see FIG. 10) including the wiper 84 from the wiper carriage 70**. Details of this process will be described later.

The casing 2 houses a frame 43A on the side in the −Y direction (i.e., on the −Y-side), a frame 43B on the side in the +Y direction (i.e., on the +Y-side), and a motion unit 45 fixed to both the frames 43A and 43B. The motion unit 45 is a unit that includes the head unit 90, the cap carriage 65, and the wiper carriage 70. When the cover **2*b* is detached from the casing 2, the +Y-side-surface of the motion unit 45** is exposed.

Figure 7:
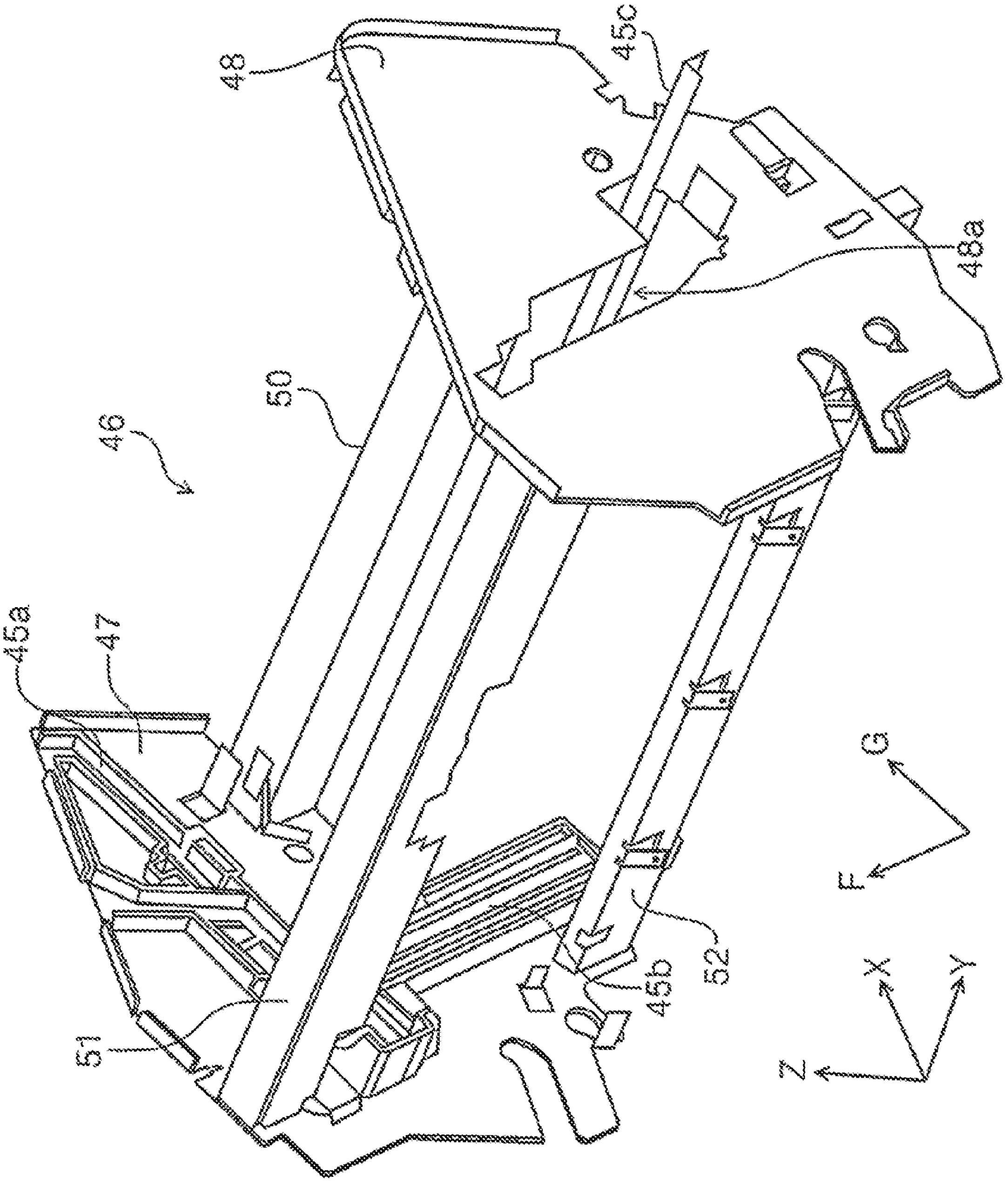
FIG. 7 is a perspective view of the frame assembly.

As illustrated in FIGS. 6 and 7, the motion unit 45 includes: a front-frame 47; and a rear-frame 48 disposed apart from the front-frame 47 in the +Y direction. Herein, the rear-frame 48 may be an example of a first side-frame, whereas the front-frame 47 may be an example of a second side-frame. Each of the front-frame 47 and the rear-frame 48 may be a metal plate that forms an X-Z plane. The front-frame 47 is coupled to the rear-frame 48 by a first joint frame 50, a second joint frame 51, and a third joint frame 52, all of which extend in the +Y direction. Herein, each of the first joint frame 50, the second joint frame 51, and the third joint frame 52 may be an example of a joint member. In this case, each of the first joint frame 50, the second joint frame 51, and the third joint frame 52 may be formed by bending a metal plate.

In this embodiment, the first joint frame 50, the second joint frame 51, and the third joint frame 52 may be welded to both the front-frame 47 and the rear-frame 48; however, they may be fixed with screws or other structure. The first joint frame 50, the second joint frame 51, and the third joint frame 52 that are fixed to both the front-frame 47 and the rear-frame 48 in this manner constitute a frame assembly 46 as illustrated in FIG. 7. It should be noted that, for the sake of convenience, the +Y-side of the front-frame 47 and the −Y-side of the rear-frame 48 are sometimes referred to as the insides, whereas the −Y-side of the front-frame 47 and the +Y-side of the rear-frame 48 are sometimes referred to as the outsides.

As illustrated in FIGS. 2 to 4, each of the first joint frame 50, the second joint frame 51, and the third joint frame 52 may be bent in such a way that its cross-section partly or entirely has a rectangular shape, in order to reliably stiffen the frame assembly 46, or the motion unit 45.

As illustrated in FIGS. 2 to 4, the first joint frame 50 may be bent in such a way that a rectangular part is formed and the remaining part extends from this rectangular part in the −G direction and is bent in the +F and the −G directions in this order. In this way, a third guide **45*c* is formed integrally with the first joint frame 50. The third guide 45*c* serves as a guide mechanism for guiding the wiper carriage 70 in the ±Y directions. The second joint frame 51 has a fourth guide 45*d* that extends in the +G direction from the main portion of the second joint frame 51 and is bent in the −F direction. The fourth guide 45*d* may be formed by bending a metal sheet, similar to the first joint frame 50 to the third joint frame 52. The fourth guide 45*d* serves as a guide mechanism for guiding the wiper carriage 70 in the ±Y directions together with the third guide 45*c*. It should be noted that FIG. 7 does not illustrate the fourth guide 45*d*** for the sake of simplicity.

As illustrated in FIG. 7, the third guide **45*c* protrudes outwardly from the rear-frame 48. More specifically, the main portion of the first joint frame 50 extends between the front-frame 47 and the rear-frame 48, whereas only the third guide 45*c* protrudes outwardly from the rear-frame 48. This structure enables the wiper carriage 70 to move to the outside of the rear-frame 48. Similar to the third guide 45*c*, the fourth guide 45*d* also protrudes outwardly from the rear-frame 48 as illustrated in FIG. 6**.

As illustrated in FIGS. 6 and 7, the rear-frame 48 has an aperture **48*a*, which conforms to and is larger than the outer shape of the wiper carriage 70 when the wiper carriage 70 is viewed from the +Y direction. This structure enables the wiper carriage 70 to move between the inside and outside of the rear-frame 48 through the aperture 48*a***.

Figure 14:
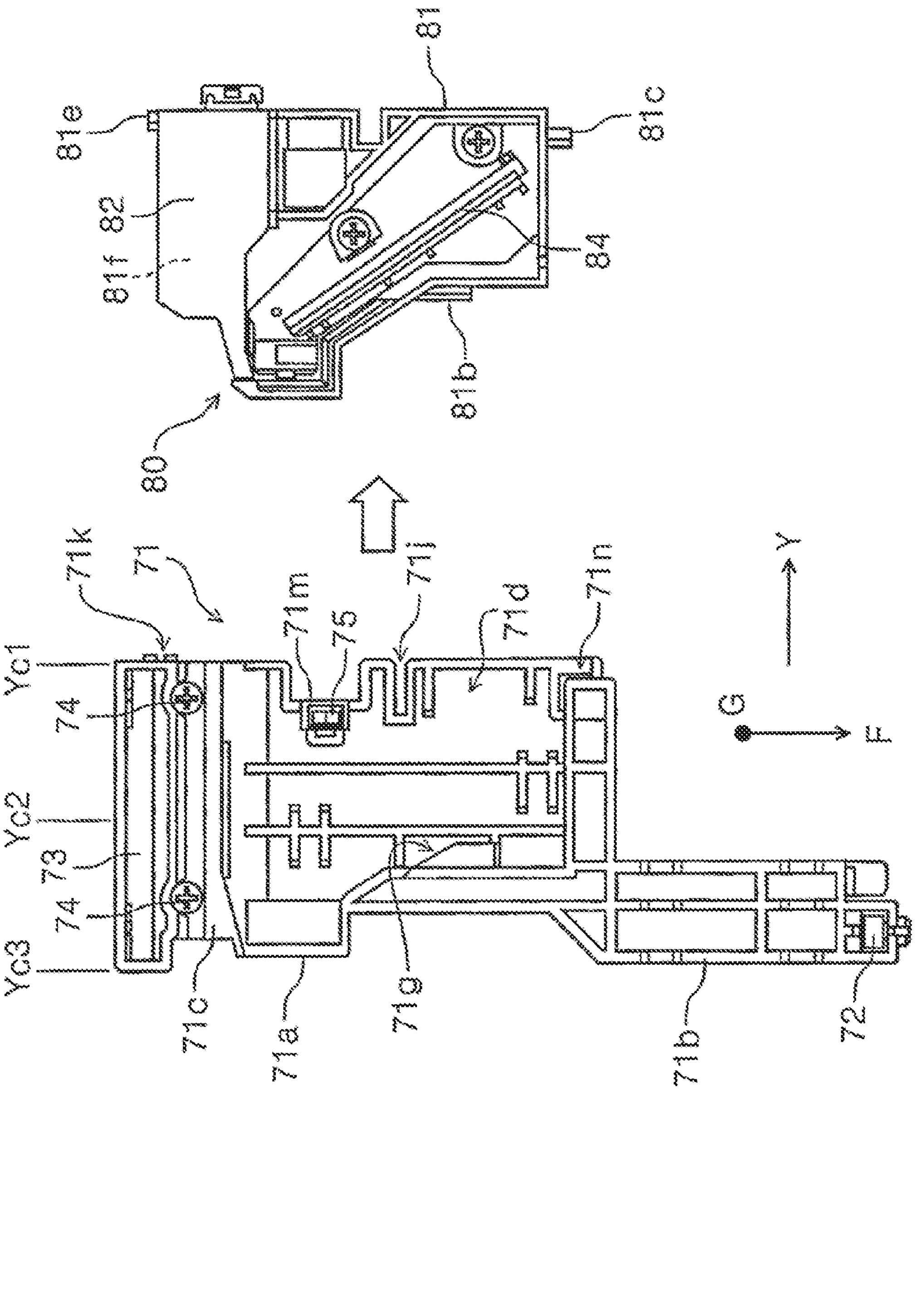
FIG. 14 is a plan view of the carriage frame and the wiper unit.

In FIG. 6, the reference character T denotes a moving range of the wiper carriage 70 in the ±Y directions with respect to a central point Yc2 (see FIG. 14). The end of the moving range T in the +Y direction is defined as a point Y1; the end of the moving range T in the −Y direction is defined as a point Y2; and the intermediate point between the points Y1 and Y2 is defined as a middle point Y3. The point Y1, which corresponds to the home position of the wiper carriage 70, is set on the side in the +Y direction (first direction) with respect to the middle point Y3 in the moving range T of the wiper carriage 70. Moreover, the position of the outer surface of the rear-frame 48 defined as a point Y4. As can be seen from FIG. 6, the point Y1 is set outside the point Y4.

Disposed on the inner surfaces of the front-frame 47 and the rear-frame 48 are respective first guides **45*a* formed in the +G direction. Referring to FIGS. 6 and 7, the first guide 45*a* provided in the front-frame 47 is viewable, whereas the first guide 45*a* provided in the rear-frame 48 is hidden. Both of the first guides 45*a* guide the head unit 90 in the ±G directions. Also, disposed on the inner surfaces of the front-frame 47 and the rear-frame 48 are respective second guides 45*b* formed in the +F direction, as illustrated in FIG. 7. Referring to FIG. 7, the second guide 45*b* provided in the front-frame 47 is viewable, whereas the second guide 45*b* provided in the rear-frame 48 is hidden. Both of the second guides 45*b* guide the cap carriage 65** in the ±F directions.

It should be noted that the motion unit 45 with the wiper carriage 70 may be regarded as a wiping device. In this embodiment, the motion unit 45 that serves as the wiping device is provided with the head unit 90 and the cap carriage 65; however, both of the head unit 90 and the cap carriage 65 are optional. For example, even if the motion unit 45 is provided with the wiper carriage 70 alone, the motion unit 45 may also be regarded as the wiping device. Even if the motion unit 45 is provided with only one of the head unit 90 and the cap carriage 65, the motion unit 45 with the wiper carriage 70 may also be regarded as the wiping device.

Figure 11:
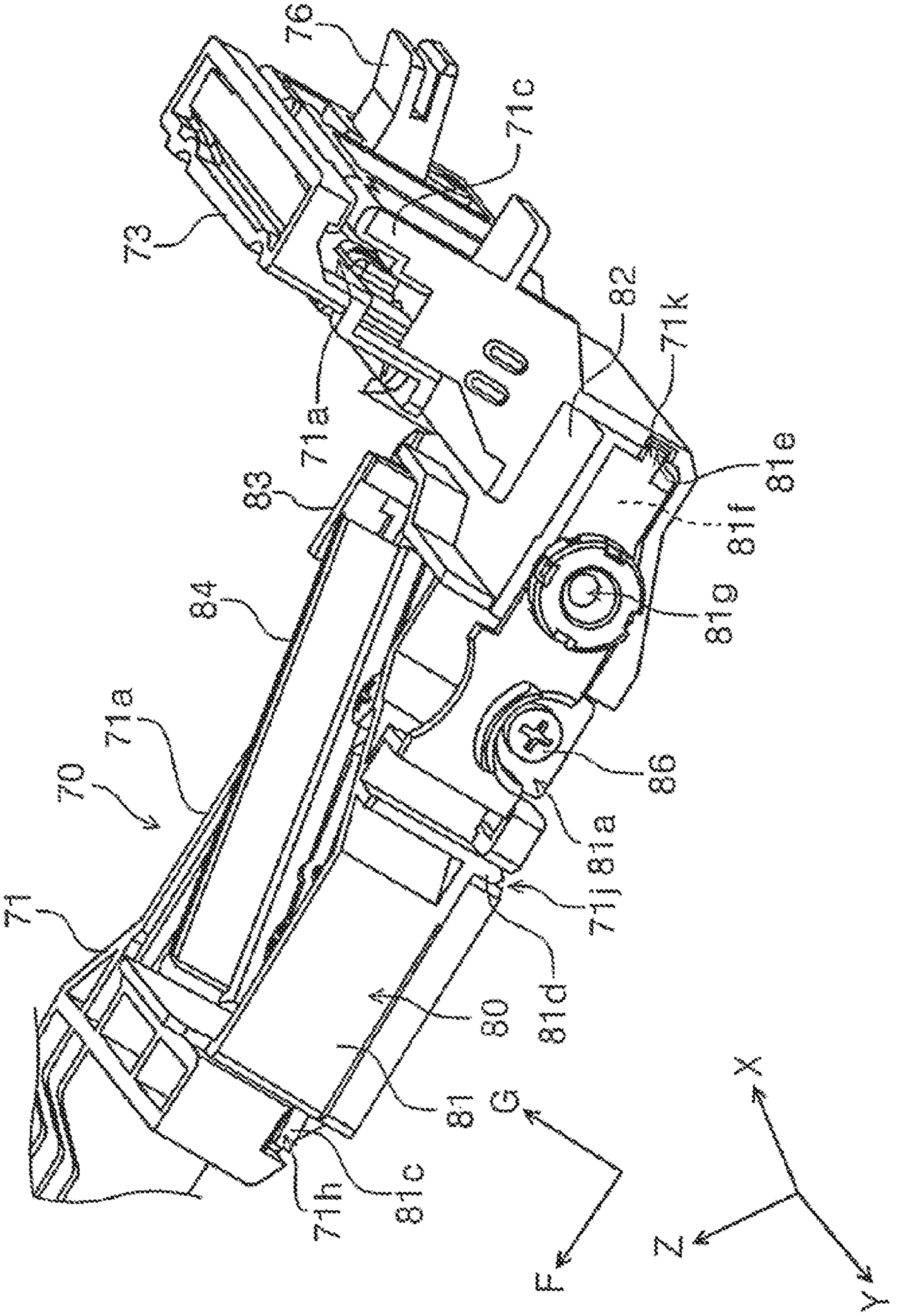
FIG. 11 is a perspective view of some key parts of the wiper carriage.

Next, a configuration of the wiper carriage 70 will be described below in detail. As illustrated in FIG. 11, the wiper carriage 70 includes a carriage frame 71 to which the wiper unit 80 is detachably attached. A maintenance person who is present on the +Y-side of the wiper carriage 70 can attach the wiper unit 80 to the carriage frame 71 by pushing the wiper unit 80 in the −Y direction or can detach the wiper unit 80 from the carriage frame 71 by pulling the wiper unit 80 in the +Y direction. Details of this process will be described later.

Figure 13:
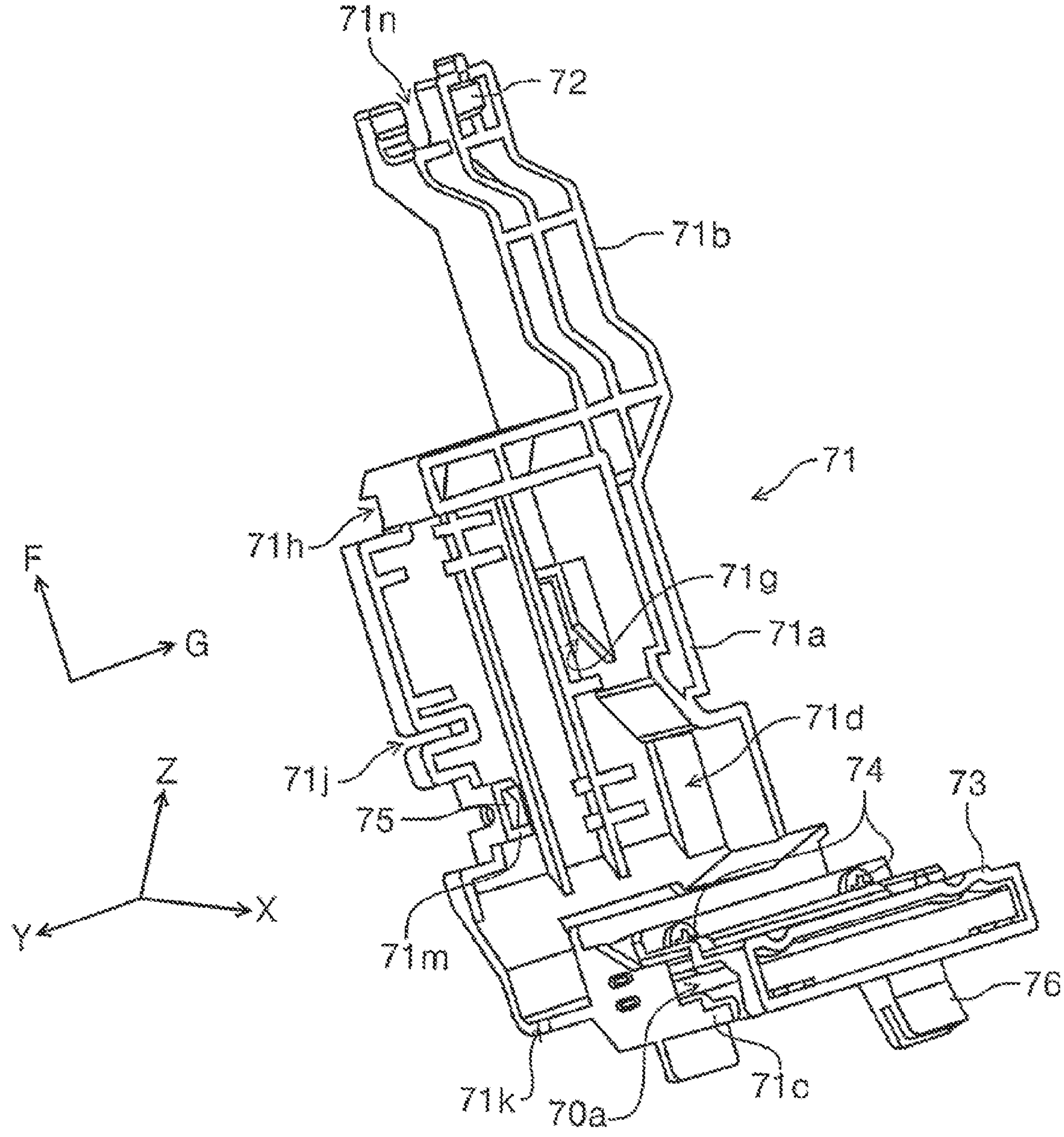
FIG. 13 is a perspective view of the carriage frame.

As illustrated in FIG. 11, the carriage frame 71 forms the base substance of the wiper carriage 70. As illustrated in FIG. 13, the carriage frame 71 includes a first part 71*a*, a second part 71*b*, and a third part 71*c*. The first part 71*a* has an assembly container 71*d* that houses the wiper unit 80. The second part 71*b* that extends in an armlike fashion from the first part 71*a* in the +F direction includes: a depression 71*n* at its +F-side end; and a driven roller 72. The depression 71*n* receives the fourth guide 45*d* (see FIG. 4). The driven roller 72 rotates around an axis extending in the +F direction in conjunction with the movement of the wiper carriage 70 in the ±Y directions while being kept in contact with the fourth guide 45*d*, thereby reducing the friction between the carriage frame 71 and the fourth guide 45*d*.

The third part 71*c* is a part that extends in the +G direction from the −F-side of the first part 71*a*. The third part 71*c* is fixed to a guided member 73 by two guided-member fixing screws 74. Formed between the third part 71*c* and the guided member 73 is an insertion hole 70*a* into which the third guide 45*c* (see FIG. 4) is to be inserted. Disposed on the −F-side of the third part 71*c* is a belt fixture 76 to which a driven belt driven by the wiper movement motor 101 (see FIG. 8) is to be fixed. This driven belt is looped between a drive pulley (not illustrated) that is rotated by the wiper movement motor 101 (see FIG. 8) and a driven pulley (not illustrated) that rotates together with this drive pulley. The wiper carriage 70 is moved in the ±Y directions by the driven belt.

The first part 71*a* includes a first receptacle 71*g*, a second receptacle 71*h*, a third receptacle 71*j*, and a fourth receptacle 71*k*, all of which are recessed in the +Y direction and receive respective insertion sections (described later) in the wiper unit 80.

The first part 71*a* further includes a nut container 71*m* erected in the +G direction near the +Y-side in order to receive a nut 75. Details of the nut 75 will be described later.

Figure 12:
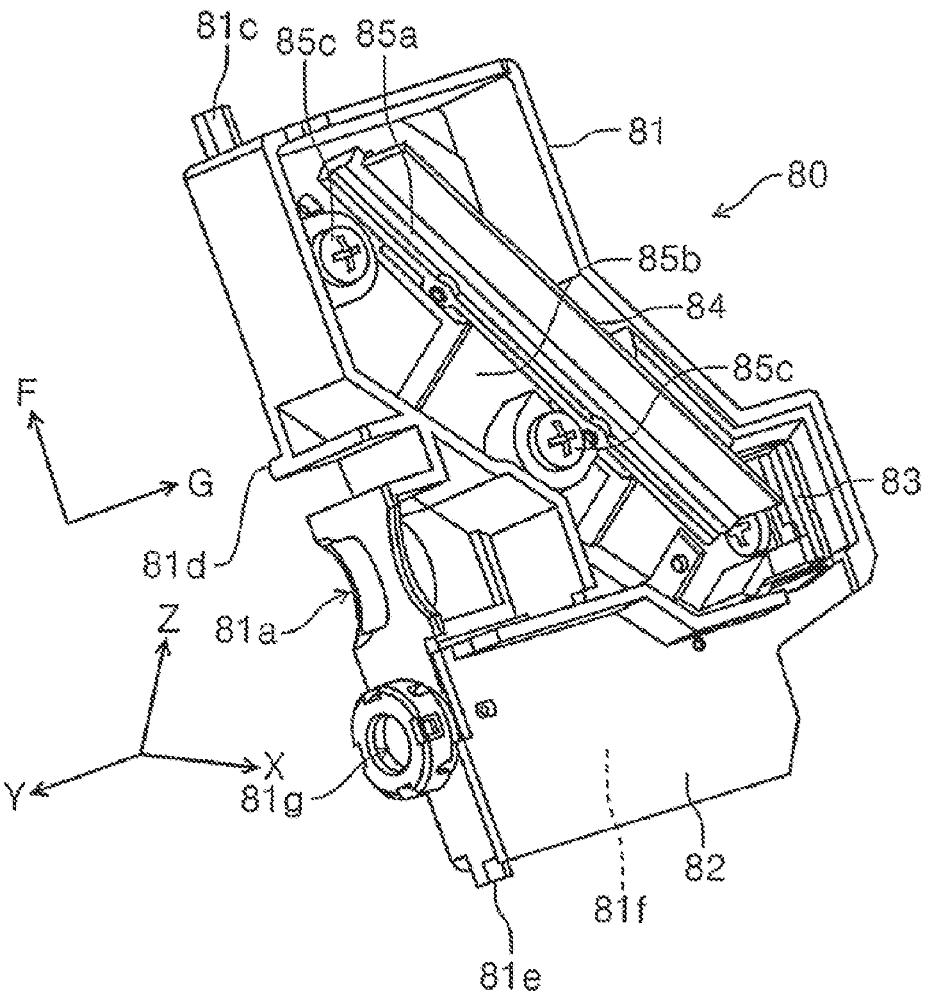
FIG. 12 is a perspective view of the wiper unit.

As illustrated in FIG. 12, the base substance of the wiper unit 80 is formed by an accommodated frame 81 that receives the wiper 84. Being made of an elastically deformable material, the wiper 84 is fixed to a first base member 85*a* fixed to a second base member 85*b*, which is further fixed to an accommodated frame 81 by two base fixing screws 85*c*. The wiper unit 80 includes a sub-wiper 83 that scrapes ink that has been left around the −F-side as a result of wiping the ink discharge surface 92 with the wiper 84.

The accommodated frame 81 includes: a second insertion section 81*c* that protrudes in the +F direction from the +F-side-surface; and a fourth insertion section 81*e* that protrudes in the −F direction from the −F-side-surface. Furthermore, the accommodated frame 81 includes a third insertion section 81*d* on the bottom which has a riblike shape and which extends in the +Y direction and is erected in the −G direction from the bottom. Moreover, as illustrated in FIG. 14, the accommodated frame 81 includes a first insertion section 81*b* that protrudes in the −Y direction from the −Y-side-surface. Details of the functions of the first insertion section 81*b* to the fourth insertion section 81*e* will be described later.

As illustrated in FIG. 12, the accommodated frame 81 further includes: a cover member 82 on the −F-side; and an ink reservoir 81*f* inside the cover member 82. In this case, the ink reservoir 81*f* serves as a liquid reservoir that temporarily stores ink removed by the wiper 84. When the wiper 84 removes ink from the ink discharge surface 92 (see FIG. 4) by wiping it, this removed ink flows to the ink reservoir 81*f* disposed below the wiper 84 in the vertical direction through an ink introducing section (not illustrated) and then is stored therein.

Figure 8:
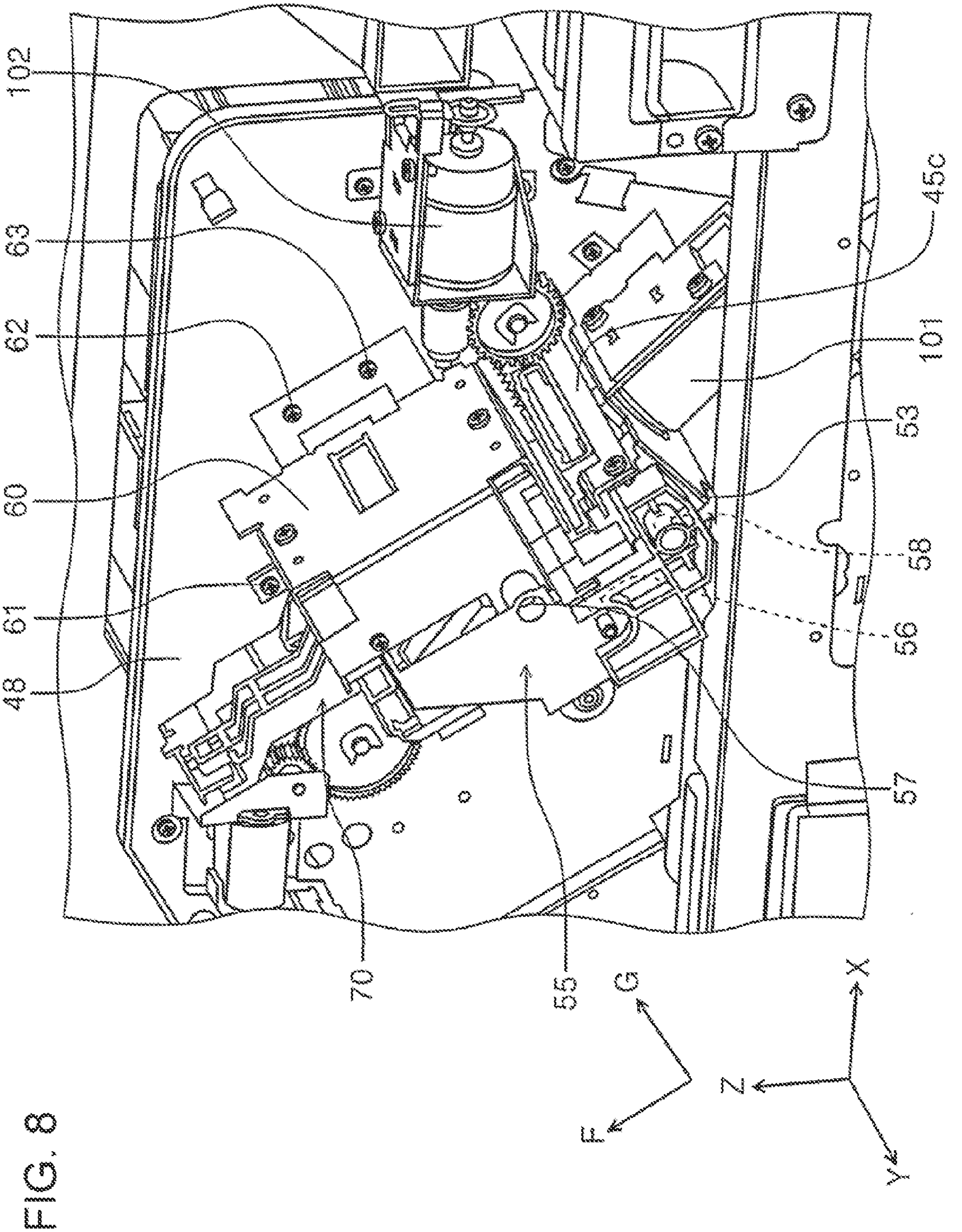
FIG. 8 is a perspective view of the printer with the cover detached and the motion unit exposed.

The accommodated frame 81 further includes an absorption hole 81*g* on the +Y-side-surface. The absorption hole 81*g* leads to the ink reservoir 81*f* via an open/close valve (not illustrated). In this case, the absorption hole 81*g* is disposed higher than the maximum height of a liquid surface in the ink reservoir 81*f*. As illustrated in FIG. 8, when the wiper carriage 70 is disposed at the home position, a coupling unit 55 with an absorption needle 56 is disposed on the +Y-side of the wiper carriage 70. When the wiper carriage 70 moves to the home position, the absorption needle 56 is inserted into the absorption hole 81*g* in the side-surface of the wiper carriage 70, thereby opening the above open/close valve. Thus, when the wiper carriage 70 moves to the home position, a pump (not illustrated) coupled to the absorption needle 56 generates negative pressure to absorb and collect the ink stored in the ink reservoir 81*f*.

Figure 15:
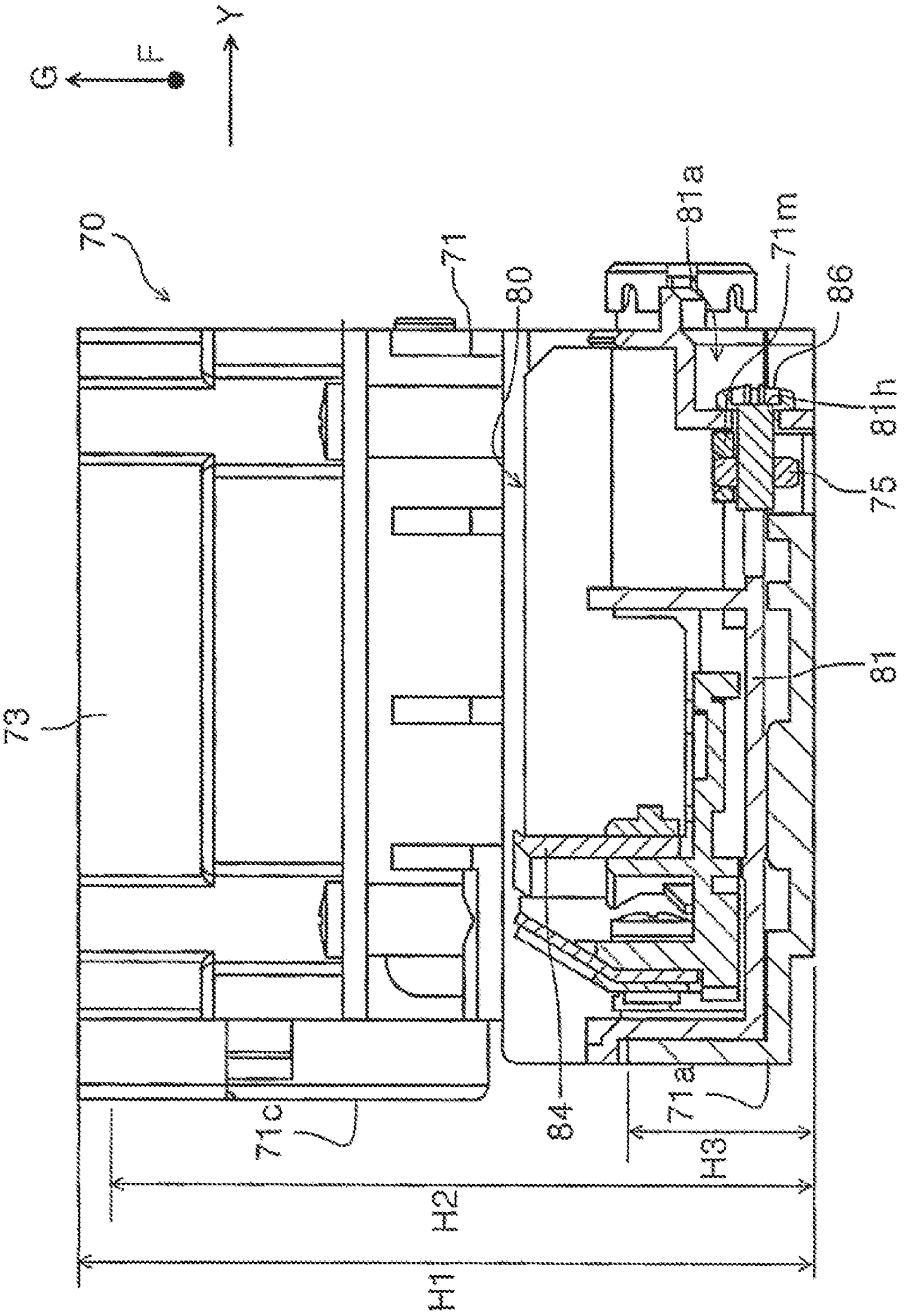
FIG. 15 is a cross-sectional view of the wiper carriage and the wiper unit.

Referring back to FIG. 12, the accommodated frame 81 further includes, on the +Y-side-surface, a depression 81*a* in which a screw hole 81*h* is formed as illustrated in FIG. 15. When the wiper unit 80 is attached to the carriage frame 71, the screw hole 81*h* faces the nut container 71*m*, thereby allowing an assembly fixing screw 86 to engage with a nut 75 inside the screw hole 81*h*. Herein, the assembly fixing screw 86 serves as a fixing member. The assembly fixing screw 86 engages with the nut 75 in the screw hole 81*h*, thereby reliably fixing the wiper unit 80 to the carriage frame 71. In this embodiment, the central axis of the assembly fixing screw 86 is parallel to the Y-axis.

Next, a description will be given below of a process of detaching the wiper unit 80 from the wiper carriage 70. FIG. 8 is a perspective view of the interior of the printer 1 with the cover 2*b* illustrated in FIG. 5 detached. In FIG. 5, the wiper carriage 70 is disposed at the home position set on the side in the +Y direction. Disposed on the +G-side of the wiper carriage 70 at the home position is a cleaning unit 60, in which a cleaning member (not illustrated) faces the wiper 84. When the wiper carriage 70 moves to the home position, the cleaning member cleans the wiper 84.

Before detaching the wiper unit 80 from the wiper carriage 70, a maintenance person first detaches the coupling unit 55. In this case, he/she can detach the coupling unit 55 by removing coupling-unit fixing screws 57 and 58 because the coupling unit 55 is fixed to the cleaning unit 60 by the coupling-unit fixing screw 57 and to the suppression frame 53 by the coupling-unit fixing screw 58. Herein, the cleaning unit 60 and the suppression frame 53 may be examples of an attaching frame to which the coupling unit 55 is attached. The central axes of the coupling-unit fixing screws 57 and 58 are parallel to the Y-axis: therefore, it is possible to remove the coupling-unit fixing screws 57 and 58 in the +Y direction and to insert the coupling-unit fixing screws 57 and 58 in the −Y direction. Moreover, the wiper movement motor 101 is fixed to a suppression frame 53, which suppresses the wiper carriage 70 from moving in the +Y direction. Thus, the wiper carriage 70 is permitted to only slightly move in the +Y direction from the home position.

Figure 9:
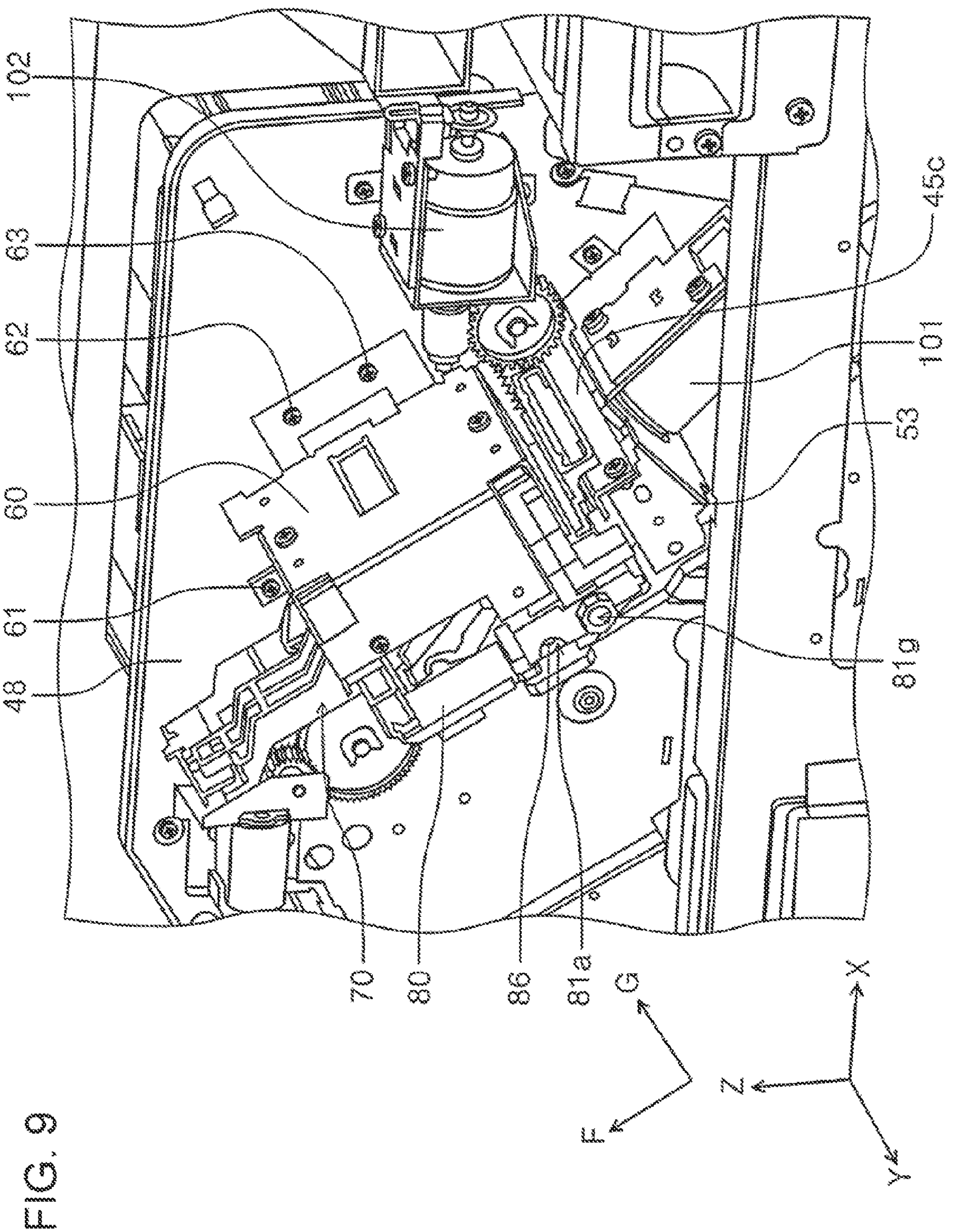
FIG. 9 is a perspective view of the printer with the cover detached, the motion unit exposed, and the coupling unit removed.

FIG. 9 illustrates the interior of the printer 1 from which the coupling unit 55 has been detached. Then, the maintenance person detaches the cleaning unit 60 fixed to the rear-frame 48 by cleaning-unit fixing screws 61, 62, and 63. The central axes of the cleaning-unit fixing screws 61, 62, and 63 are parallel to the Y-axis: therefore, it is possible to remove the cleaning-unit fixing screws 61, 62, and 63 in the +Y direction and to insert the cleaning-unit fixing screws 61, 62, and 63 in the −Y direction. It should be noted that it is not necessarily essential to detach the cleaning unit 60 before detaching the wiper unit 80 from the wiper carriage 70. However, detaching the cleaning unit 60 in advance can reduce the risk of ink spattered upon the detaching of the wiper unit 80.

Figure 10:
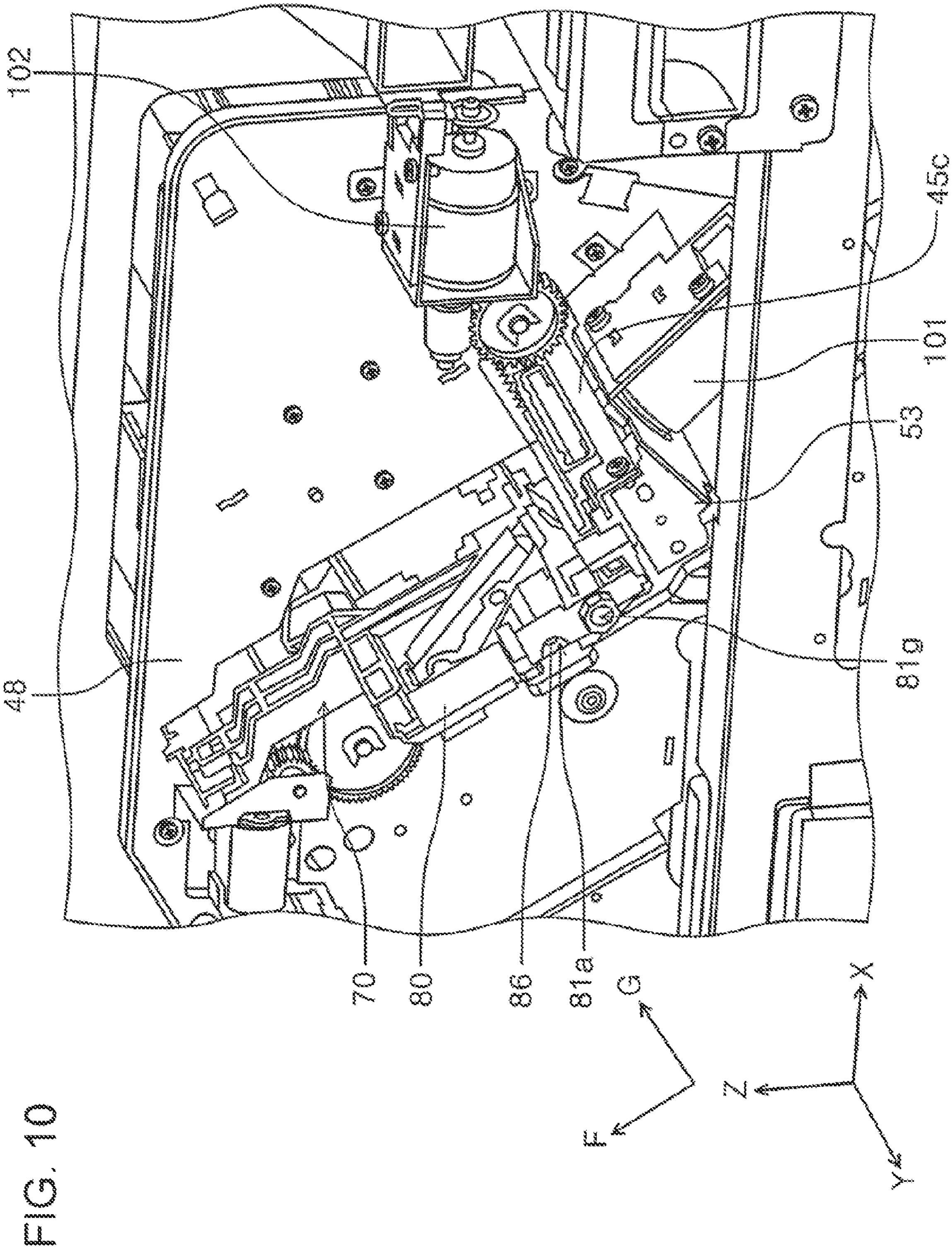
FIG. 10 is a perspective view of the printer with the cover detached, the motion unit exposed, and the coupling unit and the cleaning unit removed

FIG. 10 illustrates the interior of the printer 1 from which the cleaning unit 60 has been detached. Then, the maintenance person removes the assembly fixing screw 86 from the carriage frame 71 in the +Y direction. In this way, the fixing of the wiper unit 80 to the carriage frame 71 with the screw is released. Thus, the wiper unit 80 can be detached from the carriage frame 71.

Figure 16:
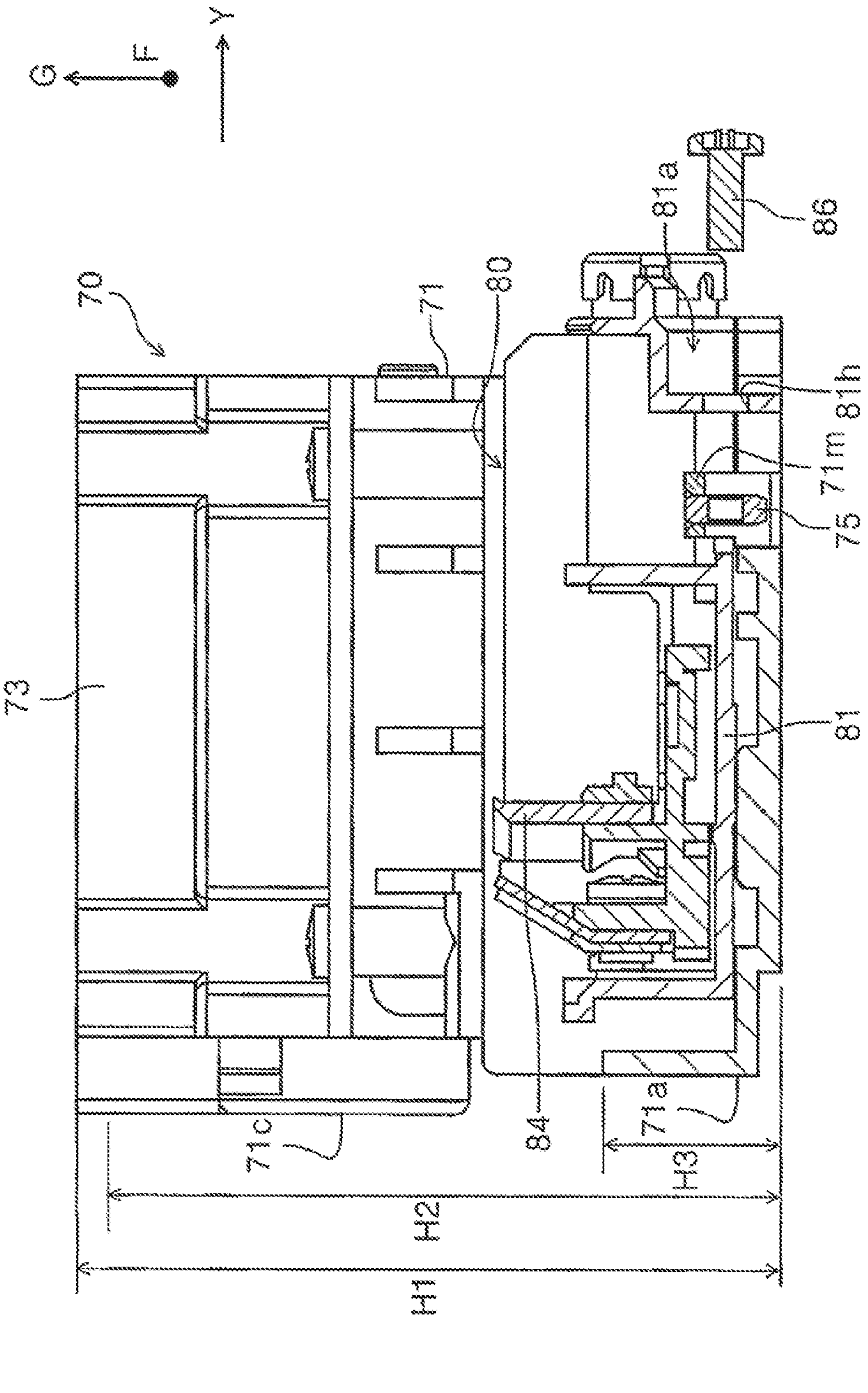
FIG. 16 is a cross-sectional view of the wiper carriage and the wiper unit when the wiper unit is being slid in the +Y direction.
Figure 17:
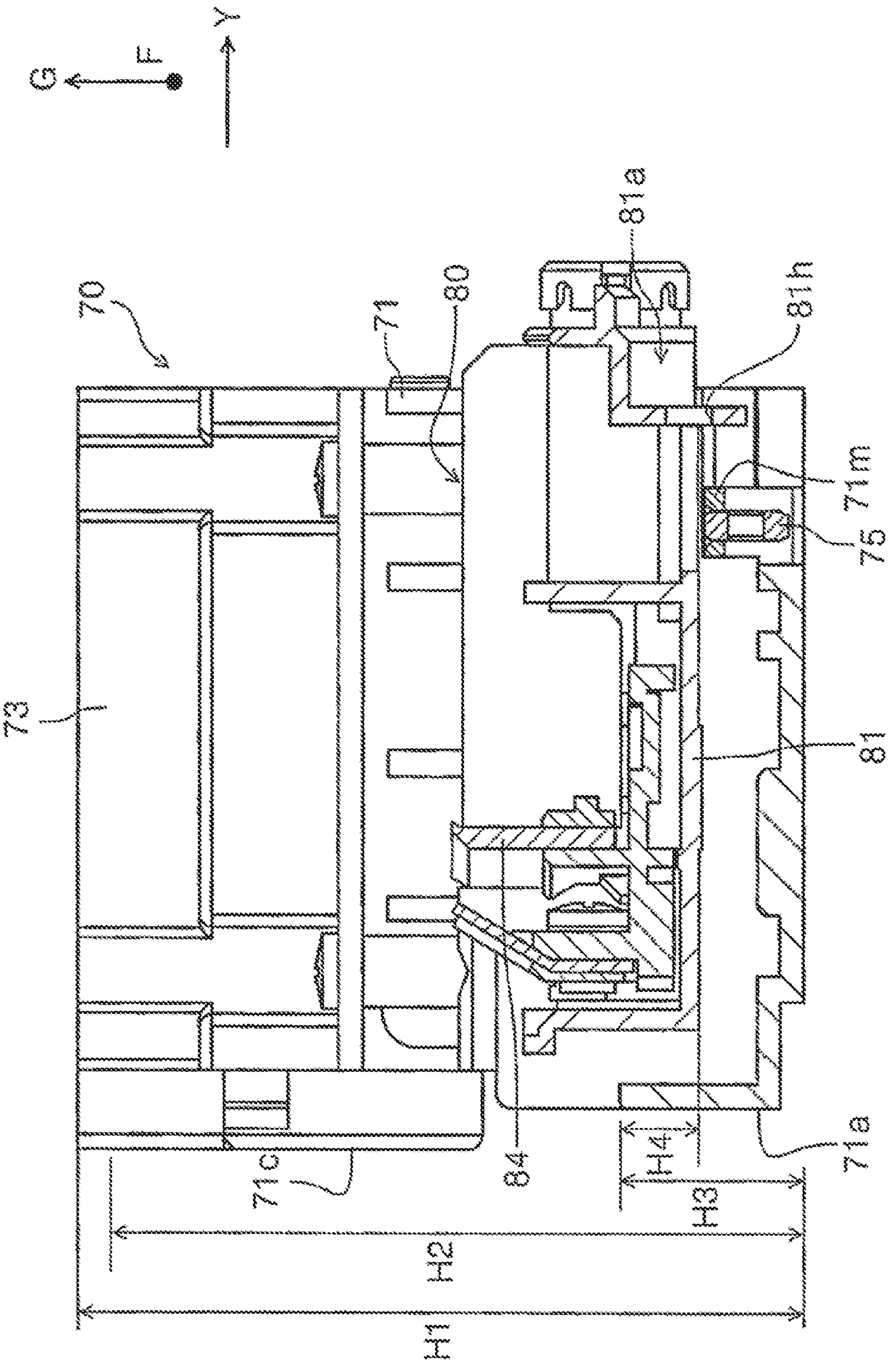
FIG. 17 is a cross-sectional view of the wiper carriage and the wiper unit when the wiper unit is being slid in the +Y direction while lifted in the +Z direction.

After having detached the assembly fixing screw 86, the maintenance person slides the wiper unit 80 in the +Y direction. In this case, as illustrated in FIG. 15, the nut container 71*m* of the carriage frame 71 partly covers the wiper unit 80 in the G direction (or as viewed from the +Y direction). For this reason, to detach the wiper unit 80 from the carriage frame 71, he/she needs to slightly slide the wiper unit 80 in the +Y direction and then slightly lift it in the +G direction, as illustrated in FIGS. 16 and 17. In this way, the nut container 71*m* is moved apart from the wiper unit 80 as viewed from the +Y direction. Consequently, it is possible to detach the wiper unit 80 from the carriage frame 71 in the +Y direction.

In FIGS. 15 to 17, the reference character H1 denotes an installation space occupied by the wiper carriage 70 in the +G direction; the reference character H2 denotes an installation space occupied by the carriage frame 71 in the +G direction; and the reference character H3 denotes an installation space occupied by the first part 71*a* in the +G direction. As illustrated in FIGS. 15 to 17, when the maintenance person detaches the wiper unit 80 from the carriage frame 71, the wiper unit 80 moves inside the installation spaces H1 and H2 in the +G direction. Thus, even when he/she pulls out the wiper unit 80 in the +Y direction while slightly lifting it in order to avoid the nut container 71*m*, as described above, the wiper unit 80 keeps covering the first part 71*a* in the +G direction (or as viewed from the +Y direction). In FIG. 17, the reference character H4 denotes the area in which the wiper unit 80 covers the first part 71*a* in the +G direction.

To attach the wiper unit 80 to the carriage frame 71, the maintenance person needs to perform the above process in the reverse order. In this embodiment, he/she slides the wiper unit 80 into the carriage frame 71 in the −Y direction, thereby inserting the first insertion section 81*b*, the second insertion section 81*c*, the third insertion section 81*d*, and the fourth insertion section 81*e* (described with reference to FIGS. 12 and 14), respectively, into the first receptacle 71*g*, the second receptacle 71*h*, the third receptacle 71*j*, and the fourth receptacle 71*k* (described with reference to FIG. 13).

The first insertion section 81*b* engages with the first receptacle 71*g*, thereby fixing the wiper unit 80 to the carriage frame 71 in the ±G directions. The second insertion section 81*c* engages with the second receptacle 71*h*, thereby fixing the wiper unit 80 to the carriage frame 71 in the ±G direction. The third insertion section 81*d* engages with the third receptacle 71*j*, thereby fixing the wiper unit 80 to the carriage frame 71 in the ±F directions. The fourth insertion section 81*e* engages with the fourth receptacle 71*k*, thereby fixing the wiper unit 80 to the carriage frame 71 in the ±G directions.

In the above way, a maintenance person who is present in the rear of the printer 1, namely, on the +Y-side of the wiper carriage 70 can detach the wiper unit 80 from the carriage frame 71 by pulling it from the printer 1 in the +Y direction and can take the wiper unit 80 out of the casing 2. Furthermore, he/she can attach the wiper unit 80 to the carriage frame 71 by inserting it into the printer 1 in the −Y direction.

As described hereinbefore, a motion unit 45, which serves as a wiping device, includes: a wiper unit 80 that includes a wiper 84 that wipes an ink discharge surface 92 of a line head 91 from which ink is to be discharged; and a wiper carriage 70 that is fixed to the wiper unit 80 and that is movable along the ink discharge surface 92 in ±Y directions, which are opposite to each other. When the wiper carriage 70 is disposed at a home position, an assembly fixing screw 86 is detachable in the +Y direction. The home position is set on a side in the +Y direction with respect to a middle point Y3 (see FIG. 6) in a moving range T (see FIG. 6) of the wiper carriage 70. The assembly fixing screw 86 serves as a fixing member that fixes the wiper unit 80 to the wiper carriage 70.

The above configuration enables a maintenance person to easily remove the assembly fixing screw 86 after he/she has accessed the wiper unit 80 from the +Y direction and before he/she detaches the wiper unit 80 in the +Y direction. In this case, the direction in which the assembly fixing screw 86 is removed does not has to strictly coincide with the +Y direction in which the wiper carriage 70 is movable: alternatively, it may be slightly different from the +Y direction and thus may contain at least one of +Z- and +X-directional components. In short, the direction in which the assembly fixing screw 86 is removed has only to coincide with a direction toward a maintenance person who will remove the assembly fixing screw 86.

The assembly fixing screw 86, which serves as the fixing member that fixes the wiper unit 80 to the wiper carriage 70, may be a screw. In this case, a maintenance person can easily remove the assembly fixing screw 86 in the +Y direction. However, the fixing member that fixes the wiper unit 80 to the wiper carriage 70 is not limited to a screw and thus may be any other member. As an alternative example, the fixing member may be a nut 75, in which case the wiper carriage 70 may be provided with a screw.

The nut 75 with which the assembly fixing screw 86 engages may be disposed on the side in the +Y direction with respect to a central point Yc2 of the wiper carriage 70 in its moving directions, as illustrated in FIG. 14. In this case, the assembly fixing screw 86 may also be disposed on the side in the +Y direction with respect to the central point Yc2. In FIG. 14, a point Yc1 corresponds to an end position to which the wiper carriage 70 is movable in the +Y direction, whereas a point Yc3 corresponds to an end position to which the wiper carriage 70 is movable in the −Y direction.

The configuration in which the assembly fixing screw 86 is disposed on the side in the +Y direction with respect to the central point Yc2 facilitates detaching the assembly fixing screw 86 in the +Y direction. This configuration also facilitates attaching the assembly fixing screw 86 from the +Y direction.

In this embodiment, the assembly fixing screw 86 may be disposed on the side in the +Y direction with respect to a rear-frame 48 in the moving directions of the wiper carriage 70. In other words, the assembly fixing screw 86 may be disposed outside the rear-frame 48. This configuration enables a maintenance person to easily detach the assembly fixing screw 86 even after the motion unit 45 has been dropped on the floor, for example. This is because the assembly fixing screw 86 is less likely to be stuck between the front-frame 47 and the rear-frame 48 when the assembly fixing screw 86 is hit on the floor.

One of the wiper unit 80 and the wiper carriage 70 may have a receptacle, whereas the other of the wiper unit 80 and the wiper carriage 70 may have an insertion section. The insertion section is inserted into the receptacle, thereby fixing the wiper unit 80 to the wiper carriage 70 in directions intersecting the +Y direction. In this embodiment, the above receptacle may be one of a first receptacle 71*g*, a second receptacle 71*h*, a third receptacle 71*j*, and a fourth receptacle 71*k* (see FIG. 13). The insertion section may be one of a first insertion section 81*b*, a second insertion section 81*c*, a third insertion section 81*d*, and a fourth insertion section 81*e* (see FIGS. 12 and 14).

The above configuration can fix the wiper unit 80 to the wiper carriage 70 in directions intersecting the +Y direction without using any screws other than the assembly fixing screw 86. Thus, this configuration can easily fix the wiper unit 80 to the wiper carriage 70 in predetermined directions. In this embodiment, the above receptacle is disposed in the wiper carriage 70, whereas the above insertion section is disposed in the wiper unit 80. As an alternative example, however, the insertion section may be disposed in the wiper carriage 70, whereas the receptacle may be disposed in the wiper unit 80.

The wiper 84 may be disposed in a diagonal position that intersects both a horizontal direction, or the +X direction, and a vertical direction, or the +Z direction. The wiper unit 80 may include an ink reservoir 81*f* (see FIG. 11) that stores ink removed by the wiper 84. The assembly fixing screw 86 may be disposed higher than the ink reservoir 81*f* in the +Z direction. This configuration suppresses the part of the wiper unit 80 fixed by the assembly fixing screw 86 from decreasing the capacity of the ink reservoir 81*f*.

The motion unit 45 may further include a coupling unit 55 that, when the wiper carriage 70 is disposed at the home position that is set on the side in the +Y direction with respect to the middle point Y3 (see FIG. 6) in a moving range T (see FIG. 6) of the wiper carriage 70, becomes coupled to the wiper unit 80 and absorbs the ink stored in the ink reservoir 81*f*. Moreover, the motion unit 45 may further include: the assembly fixing screw 86 that fixes the wiper unit 80 to the wiper carriage 70 as a first fixing member; and coupling-unit fixing screws 57 and 58 that fix the coupling unit 55 as a second fixing member, as illustrated in FIG. 8. The coupling-unit fixing screws 57 and 58 are removable in the +Y direction. This configuration enables a maintenance person to easily remove the coupling-unit fixing screws 57 and 58 after he/she has accessed the coupling unit 55 from the +Y direction and before he/she detaches the coupling unit 55 in the +Y direction. In this case, the direction in which the coupling-unit fixing screws 57 and 58 are removed does not have to strictly coincide with the +Y direction in which the wiper carriage 70 is movable: alternatively, it may be slightly different from the +Y direction and thus may contain at least one of +Z- and +X-directional components. In short, the direction in which the coupling-unit fixing screws 57 and 58 are removed has only to coincide with a direction toward a maintenance person who will remove the coupling-unit fixing screws 57 and 58.

As described with reference to FIGS. 15 to 17, the wiper unit 80 is detachable in the +Y direction while partly covering the wiper carriage 70. In this case, the direction in which the wiper unit 80 is detached does not have to strictly coincide with the +Y direction and thus may be slightly different from the +Y direction. In short, the direction in which the wiper unit 80 is detached has only to coincide with a direction toward a maintenance person who will access and remove the wiper unit 80.

The above configuration enables a maintenance person to detach the wiper unit 80 from the wiper carriage 70 without largely moving the wiper unit 80 in the +G direction. Thus, this configuration does not need to reserve a large space on the +G-side of the wiper unit 80. It is therefore possible to provide the motion unit 45 that is effective in downsizing an apparatus and that enables one or more parts to be flexibly mounted on the +G-side of the wiper unit 80. It should be noted that the above configuration and effects are still possible if a mechanism for fixing the wiper unit 80 to the wiper carriage 70 is implemented by any part other than the assembly fixing screw 86.

Figure 18:
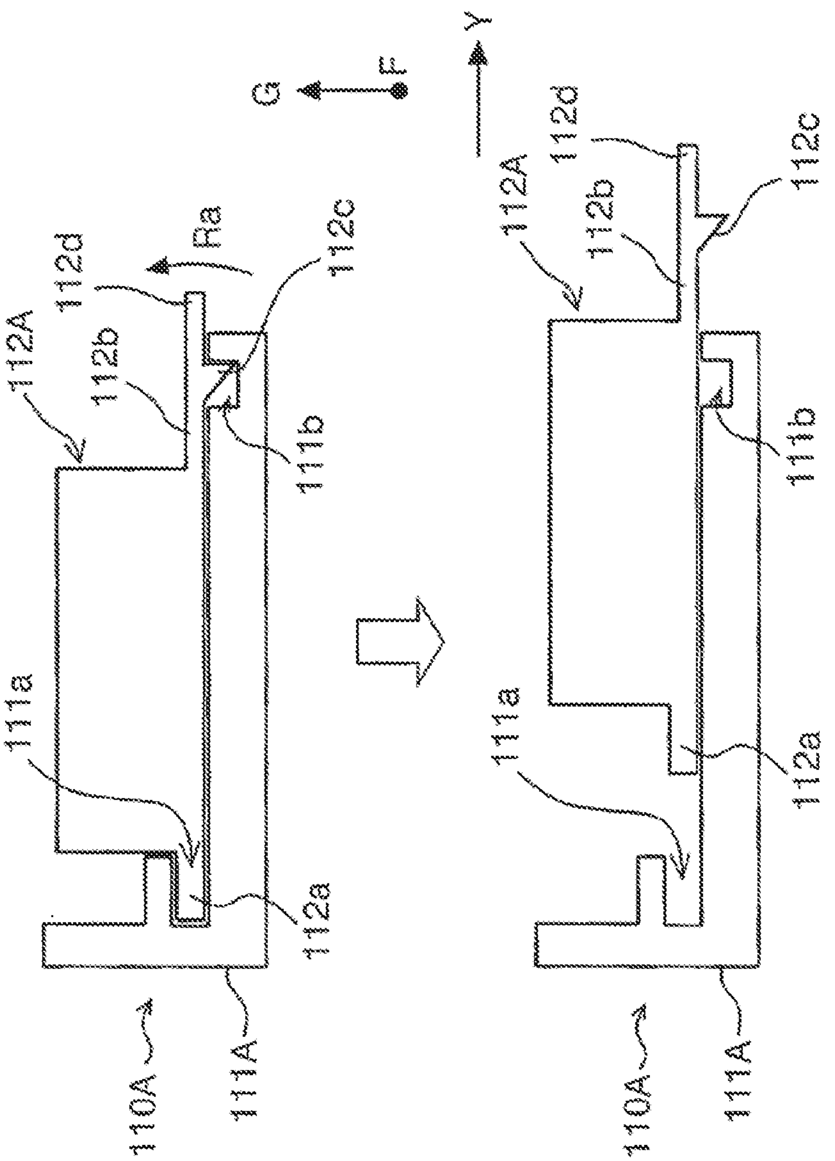
FIG. 18 illustrates a wiper carriage according to another embodiment of the present disclosure.

FIG. 18 schematically illustrates a configuration of a wiper carriage 110A in which a wiper unit 112A is disposed on a carriage frame 111A. The carriage frame 111A is an equivalent of the above carriage frame 71, whereas the wiper unit 112A is an equivalent of the above wiper unit 80. The carriage frame 111A includes a receptacle 111*a* recessed in the +Y direction, whereas the wiper unit 112A includes an insertion section 112*a* to be inserted into the receptacle 111*a*. The carriage frame 111A further includes a depression 111*b* recessed in the +G direction.

The wiper unit 112A further includes an arm 112*b* extending in the +Y direction, which has a hook 112*c* to engage with the depression 111*b* and a flange 112*d* at its +Y-side end. When the wiper unit 112A is attached to the carriage frame 111A, the insertion section 112*a* is inserted into the receptacle 111*a*, thereby fixing the wiper unit 112A to the carriage frame 111A in the ±G directions. In addition, the hook 112*c* engages with the depression 111*b*, thereby fixing the wiper unit 112A to the carriage frame 111A in the ±Y directions.

To detach the wiper unit 112A from the carriage frame 111A in the state illustrated in the upper part of FIG. 18, a maintenance person applies force to a flange 112*d* in the direction indicated by the arrow Ra. In response, the arm 112*b*, made of an elastically deformable material, is warped in this direction. As a result, the hook 112*c* disengages from the depression 111*b* so that the maintenance person can pull out the wiper unit 112A in the +Y direction, as illustrated in the lower part of FIG. 18.

The above configuration also enables the maintenance person to detach the wiper unit 112A from the wiper carriage 110A without largely moving the wiper unit 112A in the +G direction. More specifically, this configuration enables the maintenance person to detach the wiper unit 112A with almost no movement of the wiper unit 112A in the +G direction. Thus, the configuration does not have to reserve a large space on the +G-side of the wiper unit 112A. Consequently, it is possible to provide a wiper unit 112A that is effective in downsizing an apparatus and enables one or more parts to be flexibly mounted on the +G-side of the wiper unit 112A.

Figure 19:
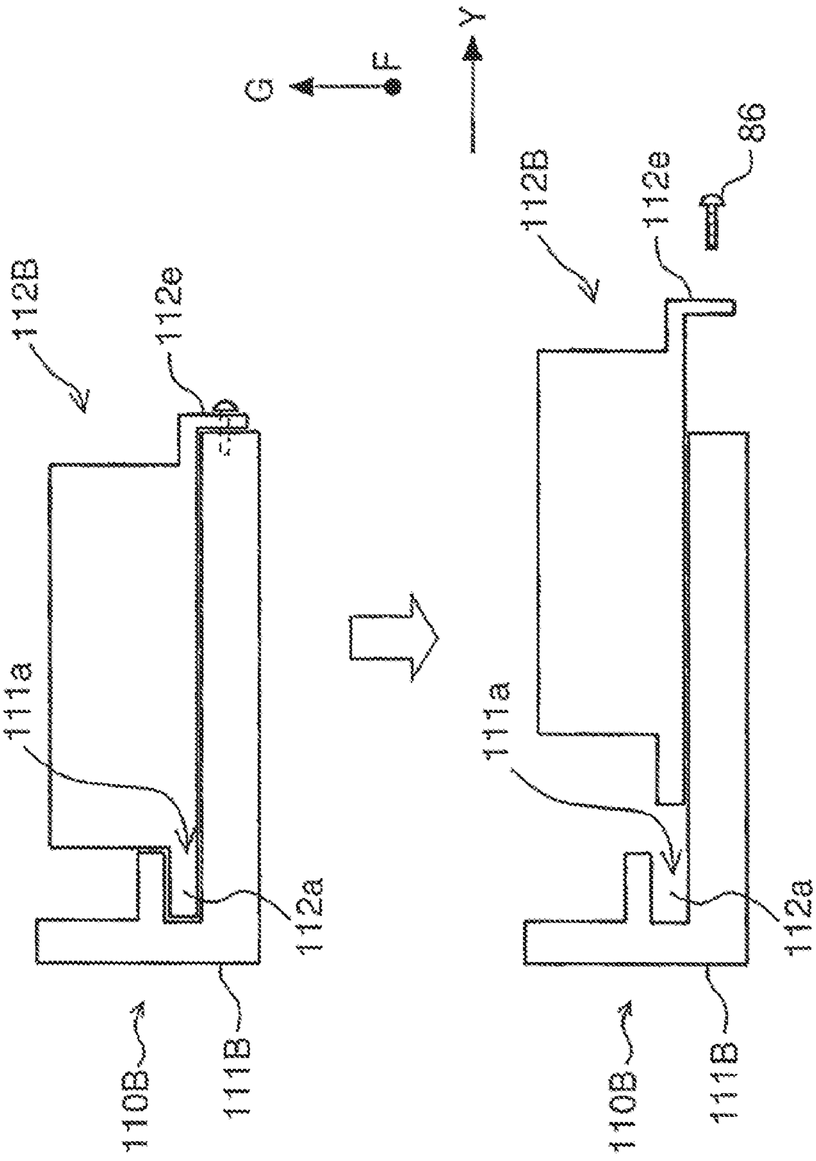
FIG. 19 illustrates a wiper carriage according to still another embodiment of the present disclosure.

FIG. 19 schematically illustrates a configuration of a wiper carriage 110B in which a wiper unit 112B can be detached from a carriage frame 111B with almost no movement of the wiper unit 112B in the +G direction. The carriage frame 111B is an equivalent of the above carriage frame 111A, whereas the wiper unit 112B is an equivalent of the above wiper unit 112A. It should be noted that the components identical to those in FIG. 18 are given the same reference characters and will not be described below.

The wiper unit 112B has a fixture 112*e* extending from the +Y-side in the −G direction, which is to be fixed to the carriage frame 111B by an assembly fixing screw 86. This configuration enables a maintenance person to detach the wiper unit 112B from the wiper carriage 110B with almost no movement of the wiper unit 112B in the +G direction. Thus, the configuration does not have to reserve a large space on the +G-side of the wiper unit 112B.

The present disclosure is not limited to the foregoing embodiments and may be modified in various ways within the scopes of the claims. Obviously, those modifications also fall within the present disclosure.

What is claimed is:

1. A wiping device comprising:
a wiper unit that includes a wiper that wipes a liquid discharge surface of a liquid discharge head from which liquid is to be discharged;
a carriage that moves along the liquid discharge surface both in a first direction and in a second direction, the first direction being opposite to the second direction; and
a fixing member attached to the wiper unit and the carriage for fixing the wiper unit to the carriage, the fixing member being provided separately from the wiper unit, wherein
when the carriage is disposed on a side in the first direction with respect to a middle point in a moving range of the carriage, the fixing member is removable in the first direction.

2. The wiping device according to claim 1, wherein
the fixing member is disposed on the side in the first direction with respect to a central point of the carriage in a moving direction of the carriage.

3. The wiping device according to claim 1, further comprising:
a first side-frame disposed on the side in the first direction with respect to the middle point;
a second side-frame disposed on a side in the second direction with respect to the middle point; and
a coupling member that extends in a moving direction of the carriage and that couples the first side-frame to the second side-frame, wherein
the fixing member is disposed on the side in the first direction with respect to the first side-frame in the moving direction of the carriage.

4. The wiping device according to claim 1, further comprising:
a receptacle disposed in one of the wiper unit or the carriage; and
an insertion section disposed in the other of the wiper unit or the carriage, wherein
the insertion section is inserted into the receptacle to fix the wiper unit to the carriage in a direction intersecting the first direction.

5. The wiping device according to claim 1, wherein
the wiper is disposed in a diagonal position that intersects both a horizontal direction and a vertical direction,
the wiper unit includes a liquid reservoir that stores liquid removed by the wiper, and
the fixing member is disposed higher than the liquid reservoir in the vertical direction.

6. The wiping device according to claim 5, wherein
the fixing member is a first fixing member, and
the wiping device further comprising:
a coupling unit that, when the carriage is disposed on the side in the first direction with respect to the middle point, becomes coupled to the wiper unit and absorbs the liquid stored in the liquid reservoir; and
a second fixing member that fixes the coupling unit to an attachment frame, the second fixing member being removable in the first direction.

7. The wiping device according to claim 1, wherein
the wiper unit is detachable in the first direction while partly covering the carriage in a direction normal to the liquid discharge surface.

8. The wiping device according to claim 1, wherein the fixing member is a screw.

9. A liquid discharge apparatus comprising:
a liquid discharge head that discharges liquid;
the wiping device according to claim 1;
a casing that houses the liquid discharge head and the wiping device; and
a cover disposed, in an openable/closable manner, on one of side-surfaces of the casing which is located on a side in the first direction with respect to the wiping device, the cover allowing access to the wiper unit by being opened.

10. The wiping device according to claim 1, wherein
the fixing member is attached with respect to the wiper unit and the carriage in the second direction.

11. The wiping device according to claim 1, wherein the wiper unit includes
a liquid reservoir that stores liquid removed by the wiper, and
a hole for discharging the liquid in the liquid reservoir.

12. The wiping device according to claim 11, further comprising:
a coupling unit; and
a suction pump that communicates with the coupling unit, wherein
when the carriage is disposed on the side in the first direction with respect to a middle point in a moving range of the carriage, the coupling unit is inserted to the hole.

13. The wiping device according to claim 1, further comprising:
a first side-frame disposed on the side in the first direction with respect to the middle point; and
a second side-frame disposed on a side in the second direction with respect to the middle point, wherein
the first side-frame has an aperture, wherein
the fixing member is configured to move between the side in the first direction of the first side-frame and the side in the second direction of the first side-frame through the aperture in a moving direction of the carriage.

14. The wiping device according to claim 1, wherein
when the carriage is disposed on the side in the first direction with respect to a middle point in a moving range of the carriage, the wiper unit is detachable in the first direction.

* * * * *